(12) United States Patent
Zhu et al.

(10) Patent No.: US 7,711,786 B2
(45) Date of Patent: May 4, 2010

(54) SYSTEMS AND METHODS FOR PREVENTING SPAM

(76) Inventors: Yunzhou Zhu, 7335 Amberleigh Way, Duluth, GA (US) 30097; Xuebin Jiang, 7335 Amberleigh Way, Duluth, GA (US) 30097

(*) Notice: Subject to any disclaimer, the term of this patent is extended or adjusted under 35 U.S.C. 154(b) by 311 days.

(21) Appl. No.: 12/017,692

(22) Filed: Jan. 22, 2008

(65) Prior Publication Data

US 2009/0044013 A1     Feb. 12, 2009

Related U.S. Application Data

(60) Provisional application No. 60/954,190, filed on Aug. 6, 2007.

(51) Int. Cl.
*G06F 15/16* (2006.01)
*G06F 3/00* (2006.01)

(52) U.S. Cl. .................. 709/206; 709/224; 709/227; 713/150; 715/760

(58) Field of Classification Search ............. 709/206, 709/224, 227, 228; 715/760; 707/3; 713/150
See application file for complete search history.

(56) References Cited

U.S. PATENT DOCUMENTS

| | | | |
|---|---|---|---|
| 5,787,271 A * | 7/1998 | Box et al. ............... | 714/4 |
| 5,973,696 A * | 10/1999 | Agranat et al. .......... | 715/760 |
| 6,023,723 A | 2/2000 | McCormick et al. | |
| 6,266,692 B1 | 7/2001 | Greenstein | |
| 6,321,267 B1 | 11/2001 | Donaldson | |
| 6,427,234 B1 * | 7/2002 | Chambers et al. ........ | 717/140 |
| 6,456,308 B1 * | 9/2002 | Agranat et al. .......... | 715/854 |
| 6,546,416 B1 | 4/2003 | Kirsch | |

(Continued)

OTHER PUBLICATIONS

U.S. Department of Homeland Security, The Crimeware Landscape: Malware, Phishing, Identitiy Theft and Beyond, A Joint Report of the U.S. Department of Homeland Security—SRI International Identity Theft Technology Council and the Anti-Phishing Working Group, Oct. 2006, p. 1-31, http://www.antiphishing.org/reports/APWG_CrimewareReport.pdf.

(Continued)

*Primary Examiner*—Khanh Q Dinh
(74) *Attorney, Agent, or Firm*—Sutherland Asbill & Brennan LLP

(57) ABSTRACT

Systems and methods are disclosed for preventing spam, including email spam and telephone spam, through the use of dynamic passcodes or dynamic signatures included with transmitted messages. Both the dynamic passcodes and dynamic signatures may be changed periodically or continually, according to an example embodiment of the invention. Qualified senders may include a dynamic signature that is automatically generated by the sender's node or exchange entity. The recipient's node or exchange entity can then use a graylist associated with the recipient account in verifying the qualified sender and/or dynamic signature. On the other hand, non-qualified senders may need to manually obtain a dynamic passcode from a dynamic passcode provider and include the dynamic passcode with the transmitted message. The dynamic passcode provider may be a public website using human interactive proofs. According to an embodiment, a non-qualified sender may be optionally pre-charged with a fee to obtain a dynamic passcode. The recipient of the message may then refund the charge if the received message is not spam.

23 Claims, 12 Drawing Sheets

U.S. PATENT DOCUMENTS

| | | | |
|---|---|---|---|
| 6,654,787 | B1 | 11/2003 | Aronson et al. |
| 6,732,157 | B1 | 5/2004 | Gordon et al. |
| 6,957,259 | B1 | 10/2005 | Malik |
| 6,986,049 | B2 | 1/2006 | Delnay |
| 7,054,906 | B2 | 5/2006 | Levosky |
| 7,181,498 | B2 | 2/2007 | Zhu et al. |
| 7,237,010 | B2 | 6/2007 | Mora |
| 7,240,366 | B2 | 7/2007 | Buch et al. |
| 7,293,065 | B2 | 11/2007 | Banister et al. |
| 7,406,593 | B2 * | 7/2008 | Rabin et al. ............... 713/150 |
| 2005/0086211 | A1 * | 4/2005 | Mayer ........................ 707/3 |
| 2006/0248063 | A1 * | 11/2006 | Gordon ....................... 707/3 |
| 2008/0040285 | A1 * | 2/2008 | Wankmueller ............... 705/67 |

OTHER PUBLICATIONS

Webroot Spyware, Inc., State of Spyware Q2 2006: A review and analysis of the impact of spyware on consumers and corporations, 2006, 22 pages, http://www.antyspyware.com.pl/state-of-spyware/2006-q2-sos.pdf.

Leyden, J., Spammers Embrace Email Authentication, The Register, Sep. 3, 2004, 2 Pages, http://www.theregister.co.uk/2004/09/03/email_authentication_spam/print.html.

Session Initiation Protocol, Sep. 26, 2007, http://www.ietf.org/html.charters/sip-charter.html.

Resnick, P., Internet Message Format, The Internet Society, Qualcom Incorporated, Apr. 2001, http://tools.ietf.org/html/rfc2822.

* cited by examiner

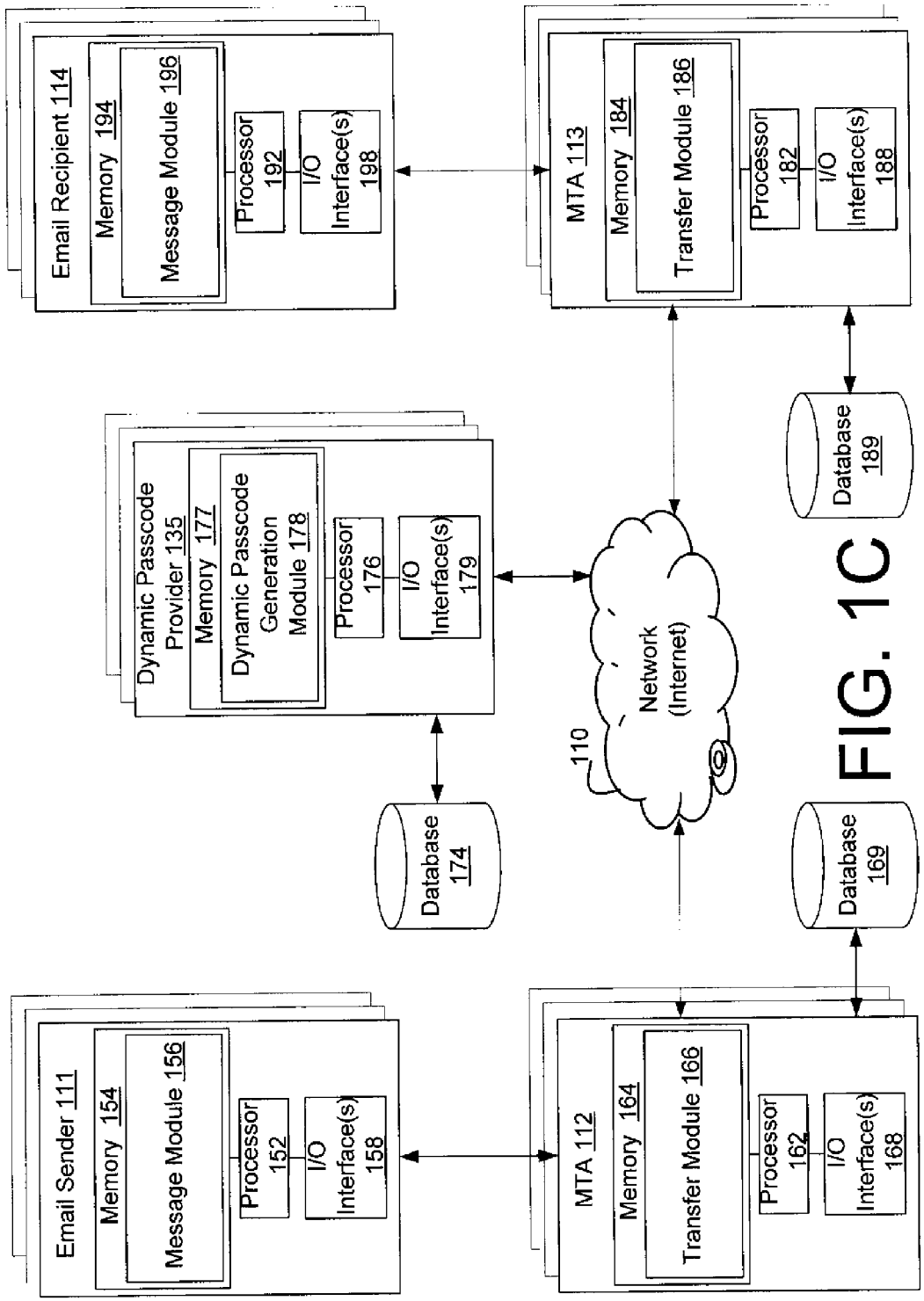

PERIOD_TIME = 24 hours
KEY_LENGTH = 2000 bytes
Start time is 00:00:00 according to clock on the timezone
of the node

| Attributes | 510a | 510b |
|---|---|---|
| Qualified static address 511 | adam.smith493@yyhh.com | davidr34@hmail.com |
| Qualified seed 512 | "bdhi93bdk93…" | "wda8bk3um73e…" |
| Qualified index 513 | 94 | |
| Qualified maximum index 514 | 999 | 99 |
| Qualified hashing function 515 | | |
| Qualified chaining function 516 | | |
| Allowed number of messages accepted in time period 517 | 2000 | 20 |
| Current Number of accepted messages in time period 518 | 14 | 0 |
| Direction type 519 | MUTUAL_QUALIFIED | OUTGOING_QUALIFIED |
| Local seed 520 | "iwdb9dp2bh…" | "cp3hw0gn5k…" |
| Local index 521 | 45 | 7 |
| Local maximum index 522 | 999 | 99 |
| Local hashing function 523 | | |
| Local chaining function 524 | | |
| Expiration date 525 | 12/31/2100 23:59:59 | 12/31/2009 09:11:23 |

FIG. 5

As a qualified sender, Ava sends a group email to Bob, Christy, and Alice.
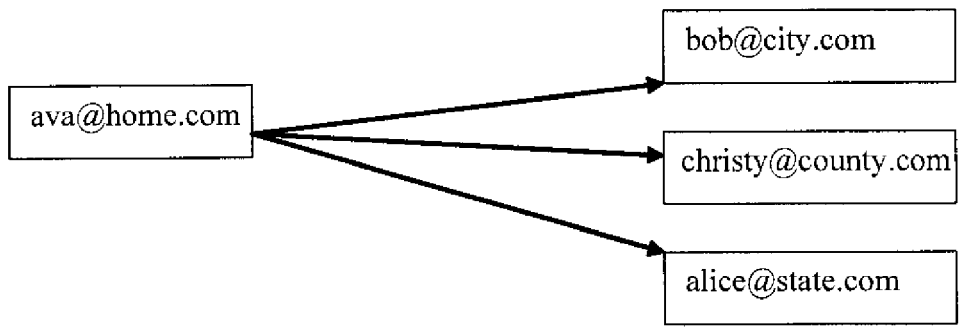
Christy replies the group email to originator Ava.
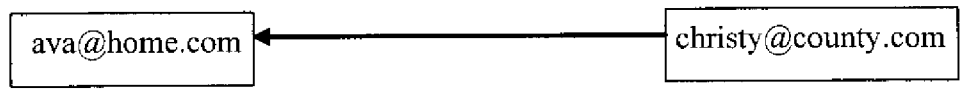
Christy's replied group email is automatically forwarded to Bob and Alice.
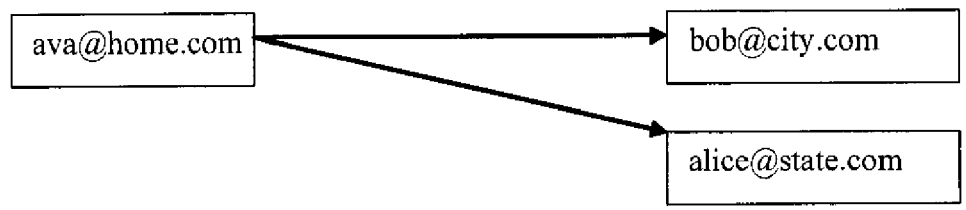
FIG. 10

SYSTEMS AND METHODS FOR PREVENTING SPAM

RELATED APPLICATION

The present application claims priority to U.S. Provisional Application No. 60/954,190, filed Aug. 6, 2007, and entitled "Dynamic Passcode and Signature to Prevent Spam," which is hereby incorporated by reference in its entirety as if fully set forth herein.

FIELD OF THE INVENTION

Embodiments of the invention relate generally to spam in electronic communications, and more particularly, to systems and methods for preventing spam such as email spam or telephonic spam by utilizing dynamic passcodes and/or dynamic signatures.

BACKGROUND OF THE INVENTION

Electronic mail, or email, is the exchange of computer-stored messages over electronic networks. Users of email systems typically have the ability to transmit email messages to each other utilizing these electronic networks. Coordinating the transmission of email is typically handled utilizing an email server, or mail transfer agent (MTA). The MTA coordinates the receipt and delivery of email messages.

A recurring problem for current email systems is that unsolicited email has become a nuisance for users. These unsolicited emails are commonly referred to as "spam". Indeed, due to the low cost of sending emails and due to the ease with which email addresses may be harvested, some individuals or businesses send spam to a large number of individuals. Spam not only occupies much of the storage space, computing resources, and traffic bandwidth of email systems, but it also wastes the recipient's time in downloading, reading, and deleting the spam. In addition, spam can also be used for phishing scams or for virus attacks. These phishing scams may involve leading unsuspecting users to counterfeit websites to obtain financial information such as usernames, passwords, and account numbers. Likewise, virus attacks may include virus, Trojan, malware, and other programs designed to harm the user's computer.

Similarly, telephone or mobile phone communications have accounts with unique phone numbers as the addresses identifying authorized subscribers. A call message within a telephone or mobile phone communications system is routed between two local exchanges for two communicating parties. However, telephone spam and mobile phone spam is becoming more popular as their cost of usage gets lower. These kinds of spam are junk text messages or voice messages delivered to the receiving device of the victims. Phone spam may interrupt the normal life of the receiver, and may need more time to be cleared, especially for voice messages. Likewise, cellular phone users may be charged for each digital message received, they may find themselves paying a premium for the privilege of receiving unsolicited advertising. Moreover, the newly emerged session initiation protocol (SIP), used for Internet telephone calls, multimedia distribution and message notification between two user agents, will face much worse spam problems because of its low cost and popularity across various networks.

SUMMARY OF THE INVENTION

Embodiments of the invention may employ dynamic passcodes and/or dynamic signatures within message communications (e.g., email messages, telephonic messages) to prevent email spam, telephone spam, and yet other spam. Instances of the dynamic passcode and dynamic signature may be continually changed without maintenance from the account owner, and each instance of the dynamic passcode and signature may be used perhaps a single time, according to an example embodiment of the invention. In this way, the used passcodes and/or signatures collected by a spammer may not be utilized to send messages to the account owner.

The use of the dynamic signatures may be supported by a graylist. For example, a graylist of each account owned by the authorized user ("recipient") may be used to store the profiles of selected legitimate senders, or qualified senders, for that account. Accordingly, the qualified sender, whose profile is in the graylist of an account, may not need to use the passcode of that account. Rather, the dynamic signatures of the sender may be included in the messages sent by the qualified sender. Another feature of the graylist of an account may be to limit the number (e.g., quantity) of messages sent by the qualified senders in a specified time period though the qualified senders could be authenticated based on their signatures. This feature may block spam sent by the legitimate businesses that send both legitimate message and spam. For example, an on-line shopping web site may send emails to the customers to confirm the ordering and delivering, and may also send emails about discount information, or other commercials.

In an example embodiment of the invention, software on the node of the qualified senders may automatically generate the dynamic signature for the qualified senders, and seamlessly put the generated dynamic signature in the message to be sent. In this situation, the qualified senders may not feel the difference between the conventional communication and the communication with messages that include the dynamic signature.

The dynamic passcode or dynamic signature may also be referred to as a dynamic tag. The dynamic passcode may be used to filter communication message for the recipient. The dynamic signature may be used to authenticate the sender for the recipient.

According to an example embodiment of the invention, there may be a spam-prevention method. The method may include receiving, at an exchange entity for a recipient, an electronic message that includes a source address associated with a sender and a dynamic tag, where the dynamic tag includes a first dynamic code and a counter. The method may also include locating a hashing function and a secret key, determining a second dynamic code using at least the hashing function, the secret key, and the counter of the dynamic tag, verifying the dynamic tag by matching the first dynamic code of the dynamic tag to the second dynamic code, and accepting the electronic message to an account of the recipient upon verifying at least the dynamic tag.

According to another example embodiment of the invention, there may be a system for spam prevention. The system may include a memory for storing data and computer-executable instructions, and a processor in communication with the memory. The processor may be operative to execute the computer-executable instructions to receive an electronic message addressed to a recipient, where the electronic message includes a source address associated with a sender and a dynamic tag, and where the dynamic tag includes a first dynamic code and a counter. The processor may be further operative to execute the computer-executable instructions to retrieve a hashing function and a secret key stored in the memory, compute a second dynamic code using at least the hashing function, the secret key, and the counter of the dynamic tag, verify the dynamic tag by matching the first dynamic code of the dynamic tag to the computed second dynamic code, and accept the electronic message to an account of the recipient upon verifying at least the dynamic tag.

According to an aspect of the invention, a dynamic tag may be stored in an extra field such as a "Dynamic tag" filed of the messages for email communication, PSTN telephone communication, cellular phone communication and SIP communication. Alternatively, for email communication, the dynamic tag may be embedded in a dynamic destination email address. According to another aspect of the invention, an account owner can predetermine the maximum number of messages accepted in a specified time period to the qualified senders to limit their message sending. According to yet another aspect of the invention, an account owner may optionally pre-charge with a fee to the non-qualified sender to request the dynamic passcode of the account. The fee may be refunded, perhaps by default, if the accepted message is determined to not be spam.

BRIEF DESCRIPTION OF THE DRAWINGS

Reference will be made to the accompanying drawings, which are not necessarily drawn to scale, and wherein:

FIG. 1C provides an example overview of example hardware that may be utilized with the email communications system of FIG. 1A, according to an example embodiment of the invention.

FIG. 5 illustrates an example graylist of an email account for distinguishing between qualified and non-qualified senders, according to an example embodiment of the invention.

FIG. 10 is an example flow diagram for sending and accepting a group email, according to an example embodiment of the invention.

DETAILED DESCRIPTION OF THE INVENTION

Figure 1A:
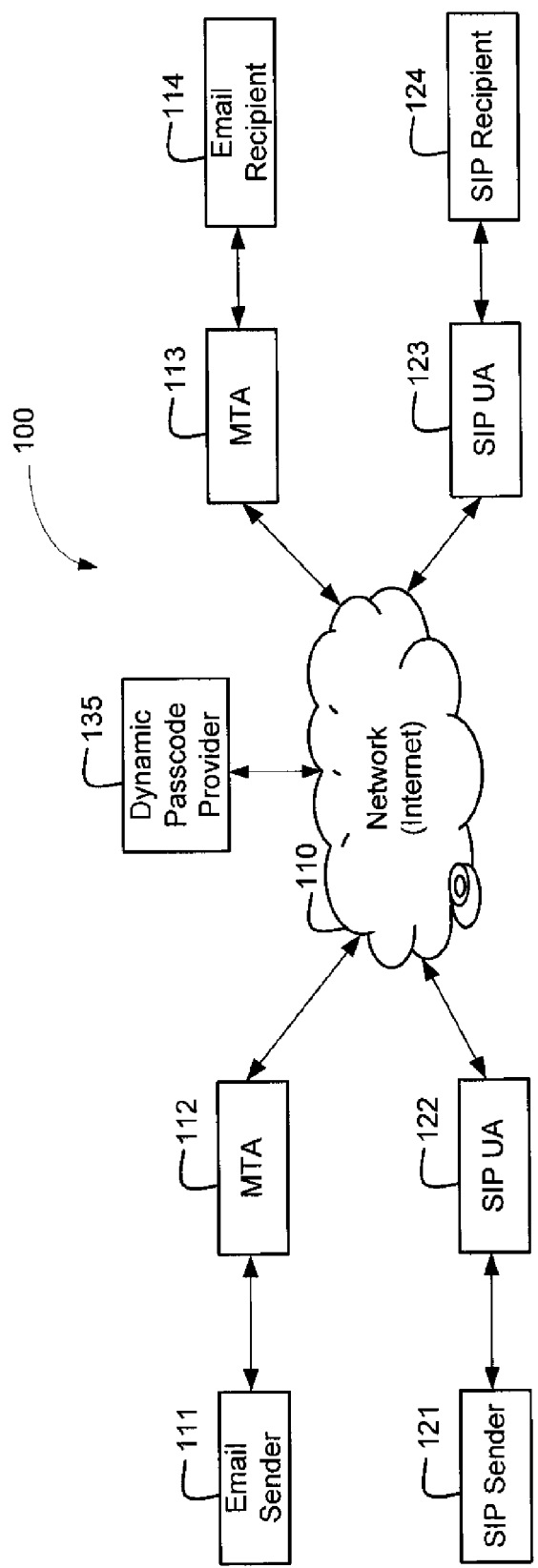
FIG. 1A provides an example overview of an illustrative email and session initiation protocol (SIP) message communication system for implementing a spam reduction technique, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention are described below with reference to block diagrams and flowchart illustrations of systems, methods, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer such as a switch, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational elements or steps to be performed on the computer or other programmable apparatus to produce a computer-implemented process such that the instructions that execute on the computer or other programmable apparatus provide elements or steps for implementing the functions specified in the flowchart block or blocks.

Accordingly, blocks of the block diagrams and flowchart illustrations may support combinations of means for performing the specified functions, combinations of elements or steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions, elements or steps, or combinations of special purpose hardware and computer instructions.

I. Message Communication Systems

Example embodiments of the invention may be utilized to prevent or reduce spam or other unwanted/unsolicited electronic messages in a variety of electronic communications and messaging systems. Indeed, examples of electronic communications and messaging systems may include email systems, telephone systems, mobile telephone systems, and session initiation protocol (SIP) communications systems, including SIP Internet Protocol (IP) telephony systems. It will be appreciated that other examples of electronic communications and messaging systems are available in accordance with other example embodiments of the invention.

Figure 1B:
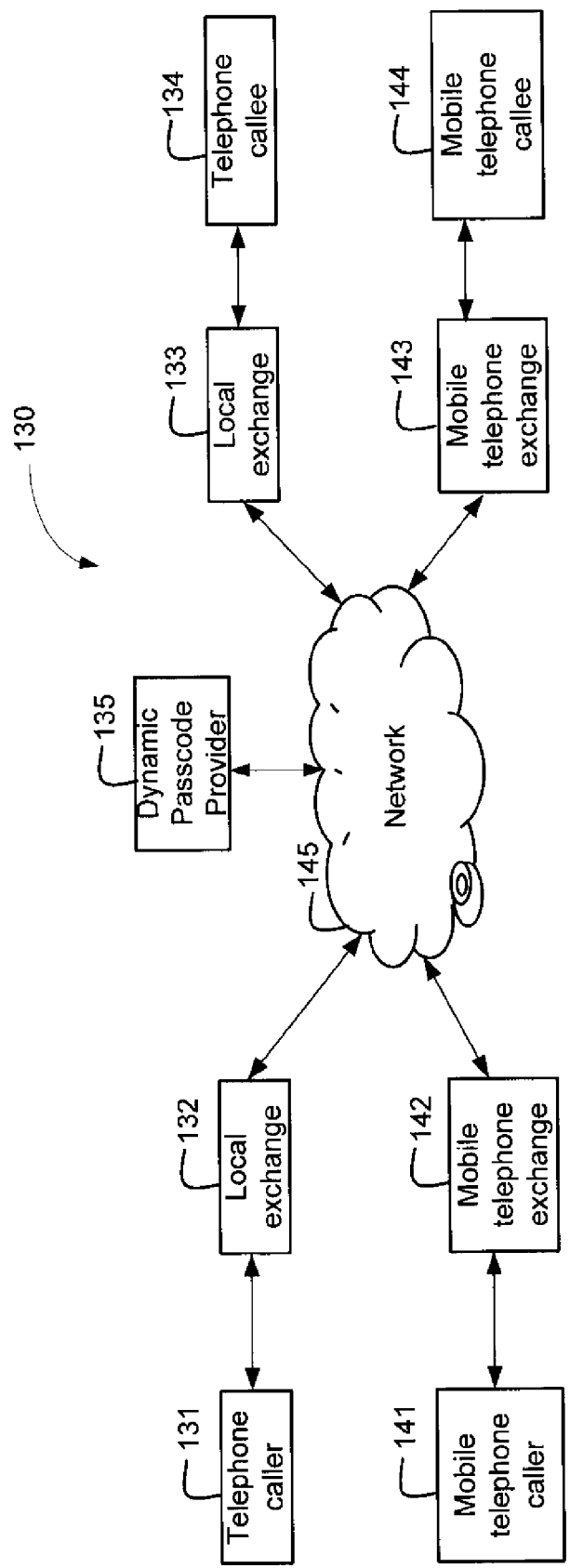
FIG. 1B provides an example overview of an illustrative telephone and mobile telephone communication system for implementing a spam reduction technique, according to an example embodiment of the invention.

FIGS. 1A and 1B illustrate example electronic communications and messaging systems that may implement spam reduction techniques in accordance with embodiments of the invention. FIG. 1A illustrates an email and SIP message communications system while FIG. 1B illustrates a telephone and mobile telephone communication system, according to example embodiments of the invention.

Turning now to FIG. 1A, the system 100 may include an email communications system, which may comprise an email sender 111, a mail transfer agent (MTA) 112 associated with the email sender 111, a network 110 such as the Internet, an email recipient 114, and an MTA 113 associated with the email recipient 114. The email communications system may also include a dynamic passcode provider 135. The MTAs 112, 113, which may also be referred to as mail servers (or more generally, as a node/exchange entity) in some example embodiments of the invention, may include one or more programs that perform email sending, forwarding, and receiving operations between one or more email senders 111 and email recipients 114. One or more email senders 111 or email recipients 114 may interoperate with the respective MTAs 112, 113 using a Web application or a stand-alone application such as a desktop program. Examples of Web applications may include an Internet-enabled browser communicating with a website such as a Yahoo! Email website, Hotmail website, or Gmail website. Likewise, examples of stand-alone applications may include Outlook, Lotus Notes, and the like, which may interoperate with the respective MTAs 112, 113 in a network, including a local area network (LAN), a wide area network (WAN), or another network. Each user, including email sender 111 and email recipient 114, may have an email box, or an account, having a unique static email address associated with a respective MTA 112, 113.

The email sender 111 may transmit one or more emails to an email recipient 114 within the system 100. More specifically, the email sender 111 may compose an email addressed to the destination email address of the email recipient 114. Likewise, the composed email may include the email sender's 111 own email address as the source email address. Alternatively or additionally, the MTA 112 may perform the function of specifying or modifying the source or destination email addresses. The composed email may then be delivered to an MTA 112, which may then transmit or transfer the composed email over a network 110 such as the Internet 110 to the destination mail transfer agent MTA 113. The MTA 113 may then perform verification processing on the received email as a process of the spam reduction technique in accordance with an example embodiment of the invention. Assuming that the received email has been verified by the MTA 113, then the MTA 113 may deliver the received email into an inbox of the email recipient 114 whose email address matches the destination email address in the received email.

The system 100 of FIG. 1A also illustrates a session initiation protocol (SIP) system, which comprises a SIP sender 121, a SIP user agent (UA) 122 associated with the SIP sender 121, the network 110 such as the Internet, a SIP recipient 124, and a SIP UA 123 associated with the SIP recipient 124. The SIP system may likewise include a dynamic passcode provider 135. The SIP system may use the SIP protocol as a universal signaling for establishing sessions over a network 110 such as the Internet for various applications, including voice-enriched e-commerce, Web page click-to-dial, Internet phone, and multi-media conference applications, according to an example embodiment of the invention.

As similarly described for the operation of the email system, in FIG. 1A, the SIP sender 121 may compose a SIP message, which may include the SIP destination address and the SIP source address. Alternatively, the SIP UA may perform the function of specifying or modifying the SIP source or destination addresses. The SIP message may then be delivered to a SIP UA 122, which may then transmit or transfer the SIP message to the destination SIP UA 123. The SIP UA 123 may then perform verification processing on the received SIP message as a process of the spam reduction technique in accordance with an example embodiment of the invention. Assuming that the received SIP message has been verified by the SIP UA 123, then the SIP UA 123 may deliver the SIP message to the SIP recipient 124.

As will be described in further detail below, both the transmitted email messages and SIP messages in the system 100 may include dynamic signatures or dynamic passcodes. According to an example embodiment of the invention, if the sender 111, 121 is a qualified sender for the respective recipient 114, 124, then the sender's client program, MTA 112, or UA 122 may automatically include a dynamic signature prior to transmitting the email or SIP message. On the other hand, if the sender 111, 121 is not a qualified sender, then the senders 111, 121 may access a dynamic passcode provider 135 to obtain or otherwise determine a dynamic passcode to include when composing the email or SIP message. According to an example embodiment of the invention, the dynamic passcode provider 135 may be a Web server, a telephone server, and the like.

FIG. 1B illustrates a telephone and mobile telephone communication system 130, according to an example embodiment of the invention. In particular, the system 130 may include a telephone communications system, which comprises a telephone caller 131, a local exchange 132 associated with the telephone caller 131, network 145 such as a public switched telephone network (PSTN) 110 and/or the Internet, a telephone callee 134, and a local exchange 133 associated with the telephone callee 134.

The telephone caller 131 may dial the destination telephone number on a telephone device, and a message (e.g., a voice message) may be transmitted to the local exchange 132. The local exchange 132 may route the received message via the network 145 (e.g., a public switched telephone network) to a destination local exchange 133. The local exchange 133 may then perform verification processing on the received telephone message as a process of the spam reduction technique in accordance with an example embodiment of the invention. Assuming that the telephone message has been verified by the local exchange 133, then the local exchange 133 may deliver the telephone message to the telephone callee 134.

FIG. 1B also illustrates a mobile telephone system, which comprises a mobile telephone caller 141, a mobile telephone exchange 142 associated with the mobile telephone caller 141, the network 145, a mobile telephone callee 144, and a mobile telephone exchange 143 associated with the mobile telephone callee 144. During operation of the system 130, the mobile telephone caller 141 may dial the destination telephone number on a mobile telephone device such as a cellular telephone, and a message may be transmitted to the mobile telephone exchange 142 via the nearest base stations. The mobile message may then be routed via the network 145 (e.g., a GMS network) to the mobile telephone exchange 143. The mobile telephone exchange 143 may then perform verification processing on the received mobile message as a process of the spam reduction technique in accordance with an example embodiment of the invention. Assuming that the mobile message has been verified by the mobile telephone exchange 143, then the mobile telephone exchange 143 may deliver the mobile message to the mobile telephone callee 144 via the nearest base station.

As will be described in further detail below, the transmitted messages in the system 130 of FIG. 1B may also include dynamic signatures or dynamic passcodes. According to an example embodiment of the invention, if the sender 131, 141 is a qualified sender for the respective recipient 134, 144, then the sender's exchange 112, 122 may automatically include a dynamic signature prior to or at the time of transmitting the voice message. On the other hand, if the sender 131, 141 is not a qualified sender, then the senders 131, 141 may use the dynamic passcode provider 135 to determine a dynamic passcode to include when initiating or dialing the call. According to an example embodiment of the invention, the dynamic passcode provider 135 may be a Web server, a telephone server, and the like.

It will be appreciated that the spam reduction techniques may be applied to a variety of messages from a variety of senders that are routed via a variety of nodes to a variety of recipients. Indeed, as described above, the messages may include email messages, SIP messages, telephone calls/messages, mobile telephone calls/messages. Likewise, the senders may include email senders, SIP senders, telephone callers, and mobile telephone callers. The nodes or exchange entities may include Mail Transfer Agents, SIP User Agents (UAs), Local Exchanges, and Mobile Telephone Exchanges, and yet other servers operating as computing devices that send, forward, route, process, and/or verify the messages. The recipients may include email recipients, SIP message recipients, telephone callees, and mobile telephone callees. While certain examples of messages, senders, and recipients have been described above for illustrative purposes, other embodiments of the invention may be applied to other messages, senders, and recipients as well. For example, according to an alternative embodiment of the invention, the spam reduction techniques described herein may be applied to Instant Message (IM) communication systems having IM messages, IM senders, IM servers, and IM recipients.

FIG. 1C provides an overview of example hardware that may be utilized with the email communications system of FIG. 1A, according to an example embodiment of the invention. It will be appreciated, however, that while FIG. 1C is discussed with respect to an email communication system, it is similarly applicable to a SIP communication system, a telephone communication system, a mobile telephone communication system, and any of yet other communication systems in example embodiments of the invention.

In FIG. 1C, an email sender 111 computer may be a computer or processor-based device capable of communicating with the MTA 112 (e.g., email server), a dynamic passcode provider 135 (e.g., Web server, telephone server), or other computing or network device via one or more networks, including network 110 (e.g., Internet). Each email sender 111 computer may include a processor 152 and a computer-readable medium, such as memory 154, coupled to the processor 152. The processor 152 can execute computer-executable program instructions stored in memory 154. Computer executable program instructions stored in memory 154 can include a message module 156. The message module 156 may be a program that assists the sender 111 in one or more of retrieving, viewing, composing, and transmitting emails via the sender's MTA 112. According to an example embodiment of the invention, the message module 156 may be a Web program, applet, or other similar program operating in an Internet Browser on the email sender 111 computer. As described above, these Web programs may be similar to Yahoo! Email, Hotmail, or Gmail. In another example embodiment of the invention, the message module 156 may instead be a dedicated or stand-alone program on the email sender 111 computer. For example, these dedication programs may be similar to Outlook, Lotus Notes, and the like. Accordingly, the message module 156 may allow for the email sender 111 computer to communicate with the sender's MTA 112 over one or more networks, including the network 110.

The sender's MTA 112 may likewise be a computer or processor-based device capable of communicating with the email sender 111 computer, the recipient's MTA 113 (e.g., mail server), or other computing or network device via one or more networks, including network 110. The sender's MTA 112 may include a processor 162 and a computer-readable medium, such as memory 164, coupled to the processor 162. The processor 162 may execute computer-executable program instructions stored in memory 164. Computer-executable program instructions stored in memory 164 may include a transfer module 166, which may generally provide for sending, forwarding, and receiving emails between senders and recipients. The transfer module 166 may be operative to determine which emails may be accepted into an email box for the incoming emails. The transfer module 166 can also process and transmit outgoing emails to the respective email MTA 113. According to an embodiment of the invention, the transfer module 166 may determine whether the sender is a qualified sender for a particular recipient and automatically provide dynamic destination email addresses of recipients for a qualified sender. In determining whether the sender is a qualified sender for a particular recipient, the transfer module 166 may access a database 169 or other memory that stores profiles of recipients (a "graylist" as described in detail below) that the sender is qualified to send emails to. In an alternative embodiment of the invention, the message module 156 may instead determine whether the sender is a qualified sender for a particular recipient and automatically provide dynamic destination email addresses of recipients for a qualified sender.

Like the sender's MTA 112, the recipient's MTA 113 may be a computer or processor-based device capable of communicating with the sender's MTA 112, the recipient 114 computer, or other computing or network device via one or more networks, including network 110. The recipient's MTA 113 can include a processor 182 and a computer-readable medium, such as memory 184, coupled to the processor 182. The processor 182 can execute computer-executable program instructions stored in memory 184. Computer-executable program instructions stored in memory 184 can include a transfer module 186, which may generally provide for sending, forwarding, and receiving emails between senders and recipients. The transfer module 186 may be operative to determine which emails may be accepted into an email box for the recipient. The transfer module 186 can also process and transmit outgoing emails to the respective MTA 112. According to an embodiment of the invention, the transfer module 186 may determine whether an email received is from a qualified sender. If the email received is from a qualified sender, then the email may be accepted into the receptive recipient's email box on the MTA 113. In determining whether an email has been received from a qualified sender, the Transfer module 186 may access a database 189 or other memory that stores a list of profiles of senders (a "graylist") that may send emails to the recipient. In addition, the transfer module 186 may also provide or otherwise update the dynamic passcode provider 135 with information used in generating dynamic email addresses or dynamic content for one or more recipients with email boxes on the MTA 113.

Like the email sender 111 computer, the email recipient 114 computer may be a computer or processor-based device capable of communicating with the MTA 113, the dynamic passcode provider 135, or other computing or network device via one or more networks, including network 110. Each recipient 114 computer may include a processor 192 and a computer-readable medium, such as memory 194, coupled to the processor 192. The processor 192 can execute computer-executable program instructions stored in memory 194. Computer executable program instructions stored in memory 194 can include a message module 196. The message module 196 may be a program that assists the recipient 114 in one or more of retrieving, viewing, composing, and transmitting emails via the recipient's MTA 113. According to an example embodiment of the invention, the message module 196 may be a Web program, applet, or other similar program operating in an Internet Browser on the recipient 114 computer. For example, these Web programs may be similar to Yahoo! Email, Hotmail, or Gmail. In another example embodiment of the invention, the message module 196 may instead be a dedicated or stand-alone program on the recipient 114 computer. For example, these dedicated programs may be similar to Outlook, Lotus Notes, and the like. Accordingly, the message module 196 may allow for the recipient 114 computer to communicate with the recipient's MTA 113 over one or more networks, including the network 110.

II. Message Addressing

Generally, an electronic communications message (e.g., email, SIP message, etc.) may include a destination address that specifies the intended recipient of the message as well as a source address that specifies where the message originated from.

Figure 2A:
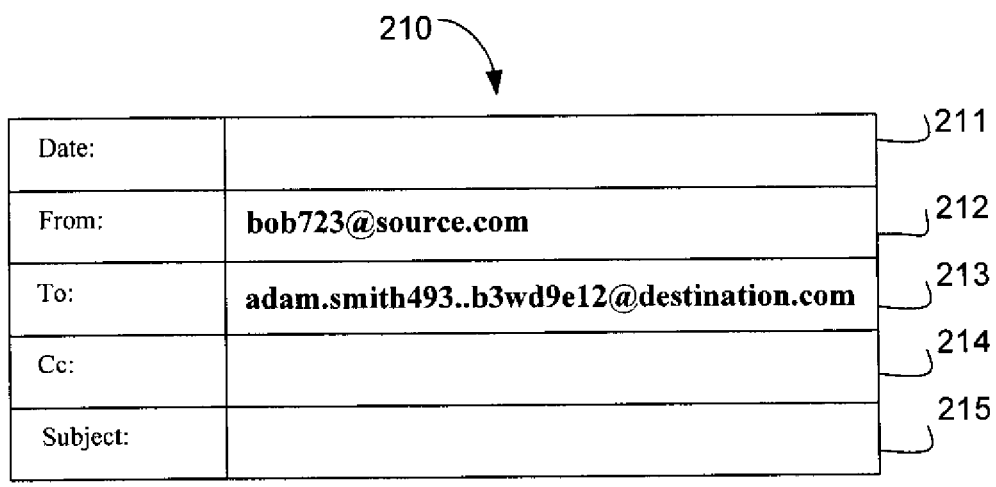
FIG. 2A illustrates some example fields of an email header in accordance with an example embodiment of the invention.

FIG. 2A illustrates some example fields of an email header 210, according to an example embodiment of the invention. In FIG. 2A, the "Date:" field 211 may be the date that the email was sent. The "From:" field 212 may provide the sender's name and email address, and may be entered by the sender or the sender's exchange entity or MTA. The "To:" field 213 and the carbon copy ("Cc:") field 214 may show the destination email addresses and/or names of one or more recipients. As described herein, an email message that specifies more than one destination email address in the "To:" and/or "Cc:" field may be referred to as a group email message. The "Subject:" field 215 may be the title of the email. It will be appreciated that while some fields have been illustrated in FIG. 2A, other fields may also be utilized without departing from example embodiments of the invention.

Figure 2B:
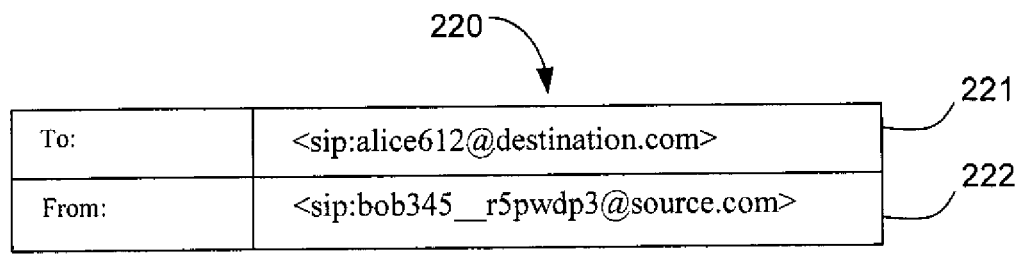
FIG. 2B illustrates some example fields in a header of a SIP message in accordance with an example embodiment of the invention.

FIG. 2B illustrates some example fields of a SIP message 220, according to an example embodiment of the invention. The SIP message may include a "To:" field 221 and a "From:" field 222. The sender of the SIP message may provide a destination SIP message address in the "To:" field 221 and a source SIP message address in the "From:" field 222. It will be appreciated that while some fields have been illustrated in FIG. 2B, other fields may also be utilized without departing from example embodiments of the invention.

With respect to telephone calls/messages, the caller may specify the destination telephone number. However, the callee may identify the caller based upon received automatic number identification (ANI) information associated with the caller. On the other hand, instead of using ANI information, a mobile telephone call/message may utilize calling party number (CPN) to store the telephone number of the caller.

III. Updates of Secret Keys Utilized for Determining Dynamic Passcodes

As will be described in further detail with respect to an example spam reduction technique in accordance with an example embodiment of the invention, a sender may be a qualified sender for a particular recipient. Where the sender is a qualified sender, a client program or node/exchange entity associated the sender (e.g., MTA, SIP UA, local exchange, etc.) may automatically include a dynamic signature when transmitting the message to a node/exchange entity associated with the recipient. On the other hand, if the sender is not a qualified sender or if a qualified sender has reached certain sending limits, then the sender may obtain a dynamic passcode from a dynamic passcode provider, which may be a web server in accordance with an example embodiment of the invention. Once the sender obtains the dynamic passcode provider, the sender may include the dynamic passcode in the message transmitted to a node/exchange entity (e.g., MTA, SIP UA, local exchange, etc.) associated with the recipient. According to an example embodiment of the invention, the dynamic passcode provider is associated with only the node/exchange entity on recipient side. Different node/exchange entities may have their different dynamic passcode providers. According to an example embodiment of the invention, a node/exchange entity may share, perhaps synchronously, the generated secret keys with one or more dynamic passcode providers via one or more channels, including a secure channel.

According to an example embodiment of the invention, the node/exchange entity that verifies the dynamic passcode may include certain predefined system parameters for periodically, perhaps continually, generating secret keys. The generated secret keys may likewise be shared with the dynamic passcode provider. Both the dynamic passcode provider and node/exchange entity may use the generated secret keys in generating dynamic passcodes. As will be described below in further detail, the dynamic passcode provider may provide the dynamic passcode to a non-qualified sender. Likewise, the node/exchange entity may use the dynamic passcode to verify a received dynamic passcode from a non-qualified sender.

According to an example embodiment of the invention, the node/exchange entity that generates the secret keys may include certain stored information associated with generation of the secret keys, including a periodic time interval (PERIOD_TIME), a secret key length value (KEY_LENGTH), and a hashing function (H) or other one-way function, according to an example embodiment of the invention. In addition, the node/exchange entity may maintain (e.g., perhaps in a memory, database, etc.) and periodically, perhaps continually, update at least two secret keys, a current secret key (KEY) and a prior secret key (OLD_KEY). According to an example embodiment of the invention, the value of the secret key may be randomly and periodically, perhaps continually, regenerated by the node in time interval (PERIOD_TIME) and with a particular length according to the secret key length value (KEY_LENGTH) and the hash function (H) or other one-way function. The latest regenerated secret key may be stored as the current secret key (KEY) while the immediate prior value of the current secret key may be stored as the prior secret key (OLD_KEY), according to an example embodiment of the invention.

Figure 3:
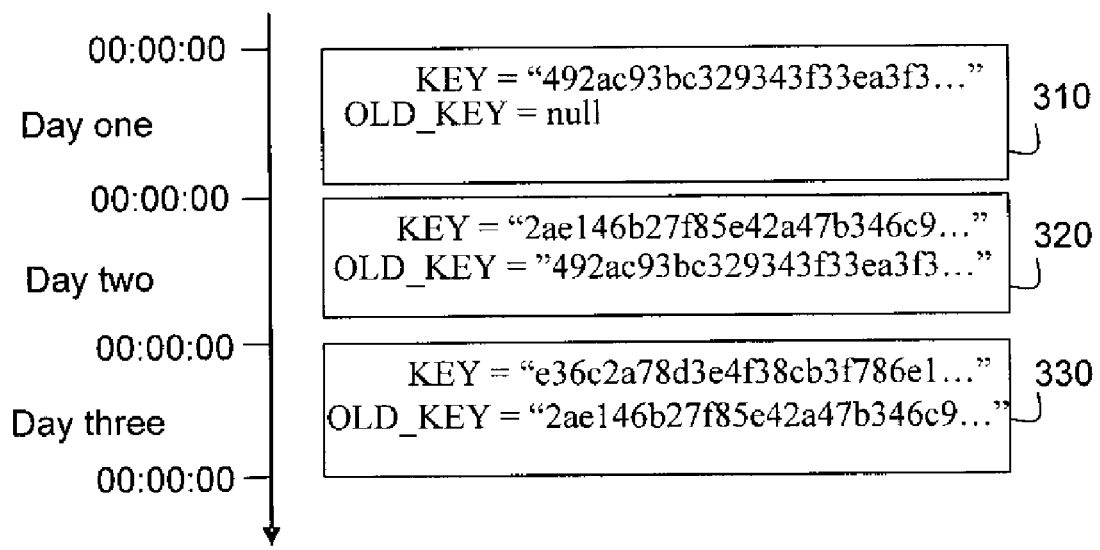
FIG. 3 shows example periodic regeneration of secret keys at a node, according to an example embodiment of the invention.

FIG. 3 illustrates a periodic regeneration of example secret keys, according to an example embodiment of the invention. In FIG. 3, the periodic time interval (PERIOD_TIME) may be set to 24 hours, and the secret key length value (KEY- _LENGTH) may be set to 2000 bytes. It will be appreciated that while example values of the periodic time interval (PERIOD_TIME) and secret key length value (KEY_LENGTH) have been described with respect to FIG. 3, other values may be utilized in other embodiments of the invention. For example, a longer secret key length value (KEY_LENGTH) value or a shorter periodic timer interval (PERIOD_TIME) would make it more difficult to comprise the secret keys.

Referring to FIG. 3, on Day one at starting time 00:00:00 AM, a node/exchange entity initially generates a random secret key "492ac93bc329343f33ea3 . . . " of length 2000 bytes. This generated random key may be stored as the current secret key (KEY). The prior secret key (OLD_KEY) may have a null value, as illustrated in FIG. 3.

After 24 hours (e.g., in accordance with PERIOD_TIME), on Day two, the node/exchange entity may create a new random secret key "2ae146b27f85e42a47b346c9 . . . " that may be stored as the current secret key (KEY) while the prior value of the current key may be stored as the prior secret key (OLD_KEY). Accordingly, the value of the prior secret key (OLD_KEY) may be "492ac93bc329343f33ea3f3 . . . ", as illustrated in block 320.

After another 24 hours, on Day three, the node/exchange entity may create a new random secret key "e36c2a78d3e4f38cb3f786e1 . . . " that may be stored as the current secret key (KEY) while the prior value of the current key may be stored as the prior secret key (OLD_KEY). Accordingly, the value of the prior secret key (OLD_KEY) may be "2ae146b27f85e42a47b346c9 . . . ", as illustrated in block 330.

It will be appreciated that while FIG. 3 illustrates retaining a current secret key and a prior secret key, other embodiments of the invention may also retain more than one prior secret key.

IV. Dynamic Signatures and Passcodes

For a destination account, there may be two or more kinds of senders, including qualified senders and non-qualified senders, according to an example embodiment of the invention. The owner of the destination account (e.g., a recipient) may typically determine and maintain a list of qualified senders to his account. According to an example embodiment of the invention, this list may be referred to as a "graylist." Qualified senders may be those senders that are authorized by the owner of the destination account according to the graylist. For example, the qualified senders may be acquaintances, friends, or business partners of the owner of the destination account. Likewise, those senders who communicate with the destination account frequently may typically be classified as the qualified senders of the destination account. On the other hand, senders who are not qualified senders of the destination account may be referred to as non-qualified senders of the destination account. According to an example embodiment of the invention, senders who are not in the graylist or other qualified sender list may be non-qualified senders. In another example embodiment of the invention, a list separate from the graylist may also be utilized to explicitly identify non-qualified senders.

According to an embodiment of the invention, dynamic passcodes or dynamic signatures may be included or embedded within or accompanying a transmitted message in accordance with a spam reduction technique. If a sender is a qualified sender for a destination account (e.g., a recipient), then a client program or node/exchange entity associated with the sender (e.g., the sender's email server, SIP UA, local exchange, etc.) may automatically determine and include the dynamic signature in a transmitted message. On the other hand, if a sender is not a qualified sender for a destination account, then the sender may need to access the dynamic passcode provider such as a webserver to obtain a dynamic passcode. The sender may then include the dynamic passcode in the message that is provided to the node/exchange entity associated with the sender for transmission to the destination account.

According to an example embodiment of the invention, both dynamic passcodes and dynamic signatures may be changed periodically, perhaps continually, in order to prevent an unauthorized user from reusing a captured dynamic passcode or dynamic signature. According to an example embodiment of the invention, each instance of the dynamic passcode or dynamic signatures may be used only a single time, perhaps within a periodic time frame.

According to an example embodiment of the invention, both the dynamic passcode and the dynamic signature may generally be referred to as a dynamic tag. The dynamic tag may include a (i) a dynamic code, and (ii) a counter, according to an example embodiment of the invention. The dynamic code may be a fixed length string while the counter may be a variable length string, according to an example embodiment of the invention. However, other embodiments of the invention, the dynamic code and counter may include other combinations of fixed and variable length strings.

According to an example embodiment of the invention, the dynamic tag may be provided in a new field of a message, perhaps in a "Dynamic tag" field or another field. For example, according to an example embodiment of the invention, the dynamic tag may be provided in a header of the message. According to another example embodiment of the invention, the dynamic tag may be embedded in the destination address of the message, or the source address of the message, provided that the newly formed addresses comply with the naming specifications of the communications protocol. Additionally, a delimiter such as "..", "___", or other character(s), may be used to indicate which portion of the embedded source or destination address corresponds to the dynamic tag. It will be appreciated that the original source or destination address may be referred to as the static address while the new address with the embedded dynamic tag may be referred to as a dynamic address. Because the dynamic address may be an extension of a static address, the dynamic address may maintain uniqueness within the communications protocol.

Figure 4A:
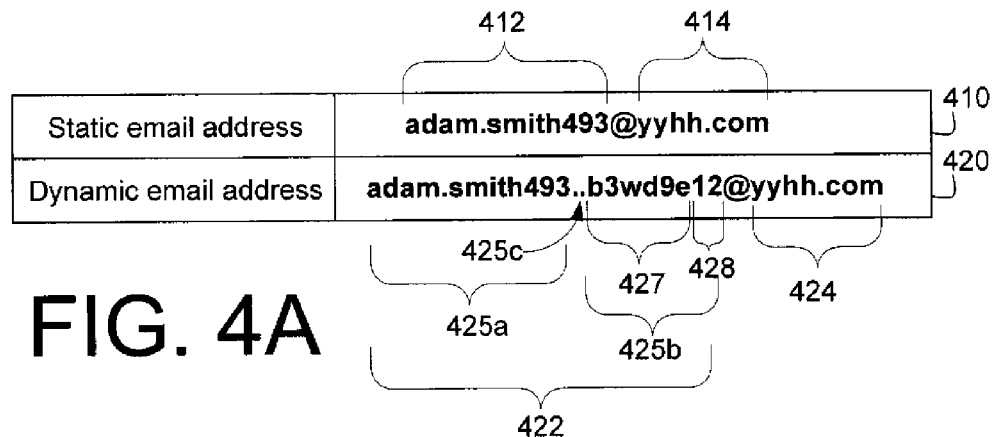
FIG. 4A provides an example static email address and a corresponding dynamic email address in accordance with an example embodiment of the invention.

FIG. 4A illustrates a static email address 410 for a recipient and a corresponding example of a dynamic email address 420 for the same recipient, according to an example embodiment of the invention. In FIG. 4A, the static email address 410 may include a local part 412 and a domain part 414. Similarly, the dynamic email address 420 may also include a local part 422 and a domain part 424. The domain part 424 of the dynamic email address 420 for the recipient may be the same as the domain part 414 of the static email address 410 for the recipient. The local part 422 may include a static portion 425a and a dynamic portion 425b, according to an example embodiment of the invention. The static portion 425a may be the same as the local part 412, according to an example embodiment of the invention. However, the dynamic portion 425b may change for each instance of the dynamic email address. In addition, according to an example embodiment of the invention, the dynamic email address 420 may further include a delimiter 425c for separating the static portion 425a from the dynamic portion 425b. The delimiter 425c may be a variety of characters or sequences of characters, including ".." or "___", according to an embodiment of the invention. However, in other embodiments of the invention, no delimiter 425c may be necessary where the dynamic portion 425b may be a fixed number of characters at a known position within the local part 422 of the dynamic email address 420. For example, the dynamic portion 425b may be six characters at either the beginning or end of the local part 422, according to an example embodiment of the invention. In addition, according to an example embodiment of the invention, dynamic portion 425b may be further subdivided into a dynamic code 427 and a counter 428. As will be described in further detail below, the counter 428 may be used in verifying the dynamic code 427.

Figure 4B:
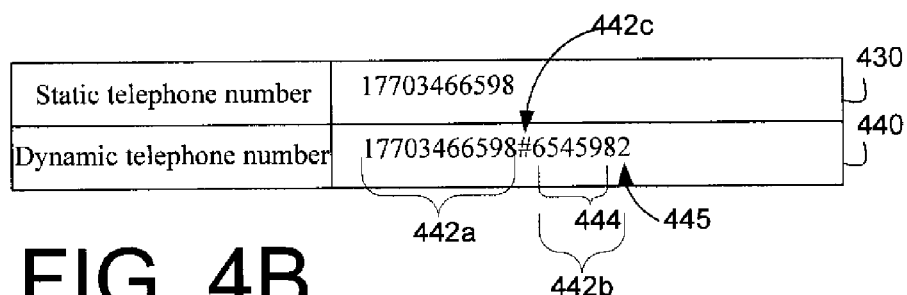
FIG. 4B provides an example static telephone number and a corresponding dynamic telephone number in accordance with an example embodiment of the invention.

FIG. 4B illustrates a static telephone number 430 and its corresponding dynamic telephone number 440, according to an example embodiment of the invention. In particular, the static telephone number 430 is "17703466598". The dynamic telephone number 440 may include a static portion 442a and a dynamic portion 442b (e.g., dynamic tag) that are separated by a delimiter 442c (e.g., "#"). In an alternative embodiment of the invention, no delimiter 442c may be necessary. The static portion 442a may be identical to the static telephone number 430. The dynamic portion 442b (e.g., "6545982") may include a dynamic code 444 ("654598") and a counter 445 (e.g., "2"). As will be described in further detail below, the counter 445 may be used in verifying the dynamic code 444.

Figure 4C:
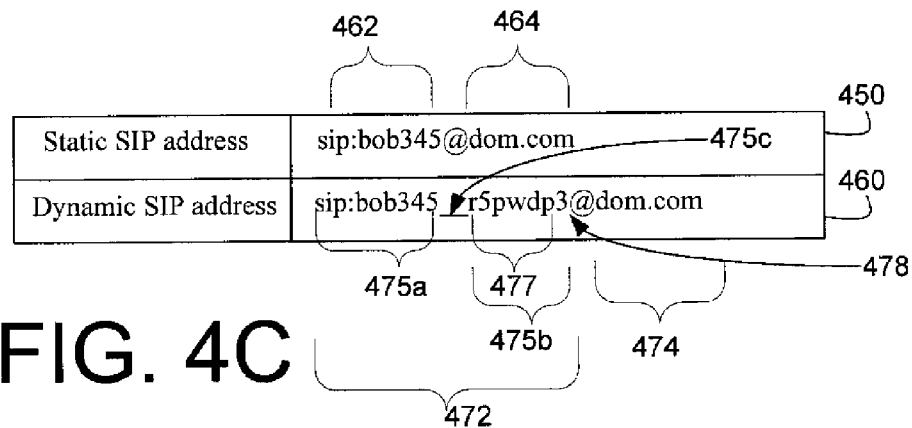
FIG. 4C provides an example static SIP address and a corresponding dynamic SIP address in accordance with an example embodiment of the invention.

FIG. 4C provides an example of a static SIP address 450 and a corresponding dynamic SIP address 460, according to an example embodiment of the invention. The static SIP address 450 may include a local part 462 (e.g., sip:bob345) and a domain part 464 (e.g., "dom.com"). In the dynamic SIP address 460, there is a local part 472 and a domain part 474. The domain part 474 of the dynamic SIP address 460 may be the same as the domain part 464 of the static SIP address 450. The local part 472 may include at least a static portion 475a (e.g., "sip:bob345") and a dynamic portion 475b (e.g., "r5pwdp3"). The static portion 475a may be the same as the local part 462, according to an example embodiment of the invention. In addition, according to an example embodiment of the invention, the dynamic SIP address 460 may further include a delimiter 475c for separating the dynamic portion 475a from the dynamic portion 475b. The delimiter 475c may be a variety of characters or sequences of characters, including ".." or "___", according to an embodiment of the invention. However, in other embodiments of the invention, no delimiter 475c may be necessary where the dynamic portion 475b may be a fixed number of characters at a known position within the local part 462 of the dynamic SIP address 460. In addition, according to an example embodiment of the invention, the dynamic portion 475b may be further subdivided into a dynamic code 477 (e.g., "r5pwdp") and a counter 478 (e.g., "3"). As will be described in further detail below, the counter 478 may be used in verifying the dynamic code 477.

It will be appreciated that other strings, characters, or signs may be used as delimiters, according to example embodiments of the invention. It will also be appreciated that some embodiments of the invention may not include any delimiters. Furthermore, different lengths of the dynamic portions or values may be utilized according to various security requirements. Likewise, other positional numeral systems with bases other than 10 may be used in the counter of the dynamic portion (e.g., dynamic tag) without departing from embodiments of the invention. Additionally, the dynamic portion (e.g., tag) or at least a part thereof may be embedded in the message in other places besides the static address. For example, the dynamic portion (e.g., dynamic tag) could alternately be placed or embedded in the display name of the email with a delimiter. For example, the string in "To:" field of an email typically may be "Adam Smith <adam493@yyhh.com>". After adding a dynamic tag "b3wd9e12" as the postfix of the display name with the delimiter "..", the displayed name may now be "Adam Smith..b3wd9e12<adam493@yyhh.com>". It will also be appreciated that telephone/cell phone messages can transfer dynamic tag interactively in a challenge-response manner, according to an example embodiment of the invention.

V. Graylists for an Account

As described above, one or more accounts (e.g., email accounts) on a node/exchange entity may be provided with a graylist or similar authentication list for distinguishing a qualified sender from a non-qualified sender. Indeed, a message from a qualified sender may be accepted and delivered into the destination account while a message from a non-qualified sender may be rejected or otherwise not delivered.

FIG. 5 illustrates an example graylist that may be utilized by an account to determine a qualified sender or otherwise distinguish a qualified sender from a non-qualified sender, according to an example embodiment of the invention. As shown, FIG. 5 illustrates a plurality of profile records 510 for qualified senders, including an illustrative first profile record 510a and an illustrative second profile record 510b. Each profile record 510 may include a qualified static address 511 specifying an email address of a qualified sender for the account. If a sender's email address is listed in the qualified static address 511, then the sender is included within the graylist of the account and may be considered a qualified sender if any additional criteria as described herein is met. On the other hand, if a sender's email address is not listed within a qualified static email address 511 or if additional criteria as described herein are not met, then the sender may be considered a non-qualified sender for the account.

Still referring to FIG. 5, according to an example embodiment of the invention, the graylist profile records 510 of the qualified senders may also include one or more of the following fields:

Qualified seed 512 (e.g., QUALIFIED_SEED): A secret key that may be generated and provided by the current qualified sender. The qualified seed may be shared between the current account and the qualified sender for use in verifying the dynamic tag (e.g., dynamic signature) from the qualified sender.

Qualified index 513 (e.g., QUALIFIED_INDEX): A prior accepted counter of the dynamic tag (e.g., dynamic signature) of an incoming message that may be sent by the qualified sender.

Qualified maximum index 514 (e.g., QUALIFIED_MAX-INDEX): Generated and provided by the qualified sender to limit the qualified index 513, according to an example embodiment of the invention. The qualified maximum index 513 may define a maximum number used in the counter of the dynamic tag for the qualified sender.

Qualified hashing function 515 (QUALIFIED_HASH): A hash function or one-way function that may be specified and provided by the qualified sender for authenticating the dynamic tag of the incoming message.

Qualified chaining function 516 (e.g., QUALIFIED_CHAIN): Specified and provided by the qualified sender for computing a new secret qualified seed based on the current secret qualified seed 512 (e.g., QUALIFIED_SEED) when the qualified index 513 (e.g., QUALIFIED_INDEX) exceeds the qualified maximum index 514 (e.g., QUALIFIED_MAXINDEX);

Allowed number of messages accepted in the time period 517: Maximum number of messages sent by the qualified sender to the current account that will be accepted during a time period (e.g., month, year, etc.).

Current Number of accepted messages in the time period 518: Number of messages accepted during a time period (e.g., month, year, etc.).

It will be appreciated that the above-described fields for a graylist profile record 510 may be utilized for verifying that an incoming message for a current account is being received from a qualified sender. According to another embodiment of the invention, the owner of the current account may, in a reverse situation, be considered a qualified sender to the email address specified in the qualified static address 511. Accordingly, the graylist profile record 510 may include a direction type 519 that may specify whether the graylist profile record 510 includes information for validating incoming messages from a qualified sender (e.g., INCOMING_QUALIFIED), for sending outgoing messages as a qualified sender (e.g., OUTGOING_QUALIFIED, or both (e.g., MUTUAL_QUALIFIED), according to an example embodiment of the invention. Where the graylist profile record 510 includes information for sending outgoing messages from the current account as a qualified sender, the fields of the graylist profile record 510 may include one or more of the following:

Local seed 520 (e.g., LOCAL_SEED): Generated by the owner of the current account, and may be shared with the qualified sender specified by the qualified static address 511, for use in generating the dynamic tag for inclusion in the outgoing message.

Local index 521 (e.g., LOCAL_INDEX): The last counter of the dynamic tag (e.g., dynamic signature) in the outgoing message sent by the owner of the current account as the qualified sender to the email address in the qualified static address 511.

Local maximum index 522 (e.g., LOCAL_MAXINDEX): Generated by the owner of the current account to limit the local index 521, and may be shared with the qualified sender specified by the qualified static address 511. The local maximum index 522 may define a maximum number used in the counter of the dynamic tag for the outgoing message.

Local hashing function 523 (e.g., LOCAL_HASH): A hash function or one-way function specified by the owner of the current account, and may be shared with the qualified sender specified by the qualified static address 511. The local hashing function may be used for generating the dynamic tag (e.g., dynamic signature) of the outgoing message with destination address QUALIFIED_ADDRESS.

Local chaining function 524 (e.g., LOCAL_CHAIN): Specified by the owner of the current account, and may be shared with the qualified sender specified by the qualified static address 511, for computing the new local seed based on the current local seed 520 (e.g., LOCAL_SEED) when local index 521 exceeds the local max index 522.

According to an example embodiment of the invention, it will be appreciated that qualified seed 512 (e.g. "bdhi93bdk93 ... ") of the profile 510a in the current account may become a local seed 512 in the graylist of account adam.smith493@yyhh.com. For example, for user A and B, user A's Qualified fields for user B may be user B's Local fields for user A, and user B's qualified fields for A may be A's Local fields for B. It will also be appreciated that in accordance with an example embodiment of the invention, one or more of the graylist profile records 510 may have an associated expiration date 525. Accordingly, a graylist profile record 510 may become invalid after the expiration date 525. Likewise, the graylist profile records 510 may specify not only the qualified senders of the account, but also how many messages may be sent by a qualified sender in a particular time period.

According to another embodiment of the invention, a qualified hashing function 515 and a local hashing function 523 may be any function that can convert a string A to another string B, where string B may be difficult to predict if the hashing function is compromised. For example, the hash function 515 and the local hashing function 523 may comprise one or more of a family of one-way functions, including one-way quasi-random functions, according to an example embodiment of the invention. Likewise, the hash function 515 and the local hashing function 523 may be the same function and/or publicly available functions, according to an example embodiment of the invention. According to an example embodiment of the invention, if a dynamic tag is embedded in the dynamic destination address, the string B converted from A may include printable characters.

According to another embodiment of the invention, the chaining functions such as qualified chaining function 516 (or local chaining function 524) may be any function used in generating a new seed from the existing qualified seed 512 (or local seed 520). According to an illustrative embodiment of the invention, let the last character of a local seed 520 (e.g., LOCAL_SEED) be a non-digital character. Each performance of local chaining function 524 on the current local seed 520 (e.g., LOCAL_SEED) may add an incremental decimal digit string. In this illustrative embodiment, a local seed 520 may be updated as follows:

---

Let LOCAL_SEED be "shdfk5yp8er".
LOCAL_CHAIN is then defined as
LOCAL_CHAIN("shdfk5yp8er") = "shdfk5yp8er1";
LOCAL_CHAIN("shdfk5yp8er1") = "shdfk5yp8er2";
LOCAL_CHAIN("shdfk5yp8er2") = "shdfk5yp8er3";
LOCAL_CHAIN("shdfk5yp8er9") = "shdfk5yp8er10";
LOCAL_CHAIN("shdfk5yp8er10") = "shdfk5yp8er11";
LOCAL_CHAIN("shdfk5yp8er19") = "shdfk5yp8er20";

---

According to an example embodiment of the invention, an owner, administrator, or other designee of the current account may modify a graylist associated with the current account. For example, the graylist may be modified to insert, edit, and delete one or more graylist profile records 510, including records 510a and 510b. According to an example embodiment of the invention, before a new graylist profile record 510 may be added, the owner, administrator, or designee may receive, transmit, and/or exchange the information needed for the graylist profile 510 via a variety of communication channels. According to an example embodiment of the invention, these may include electronic communications channels. For example, the owner of the current account may communicate with another entity as non-qualified senders using dynamic passcodes described herein. It will be appreciated that many variations of the above-described graylist profile records 510 may be available without departing from embodiments of the invention.

VI. The History List of an Account

Figure 6:
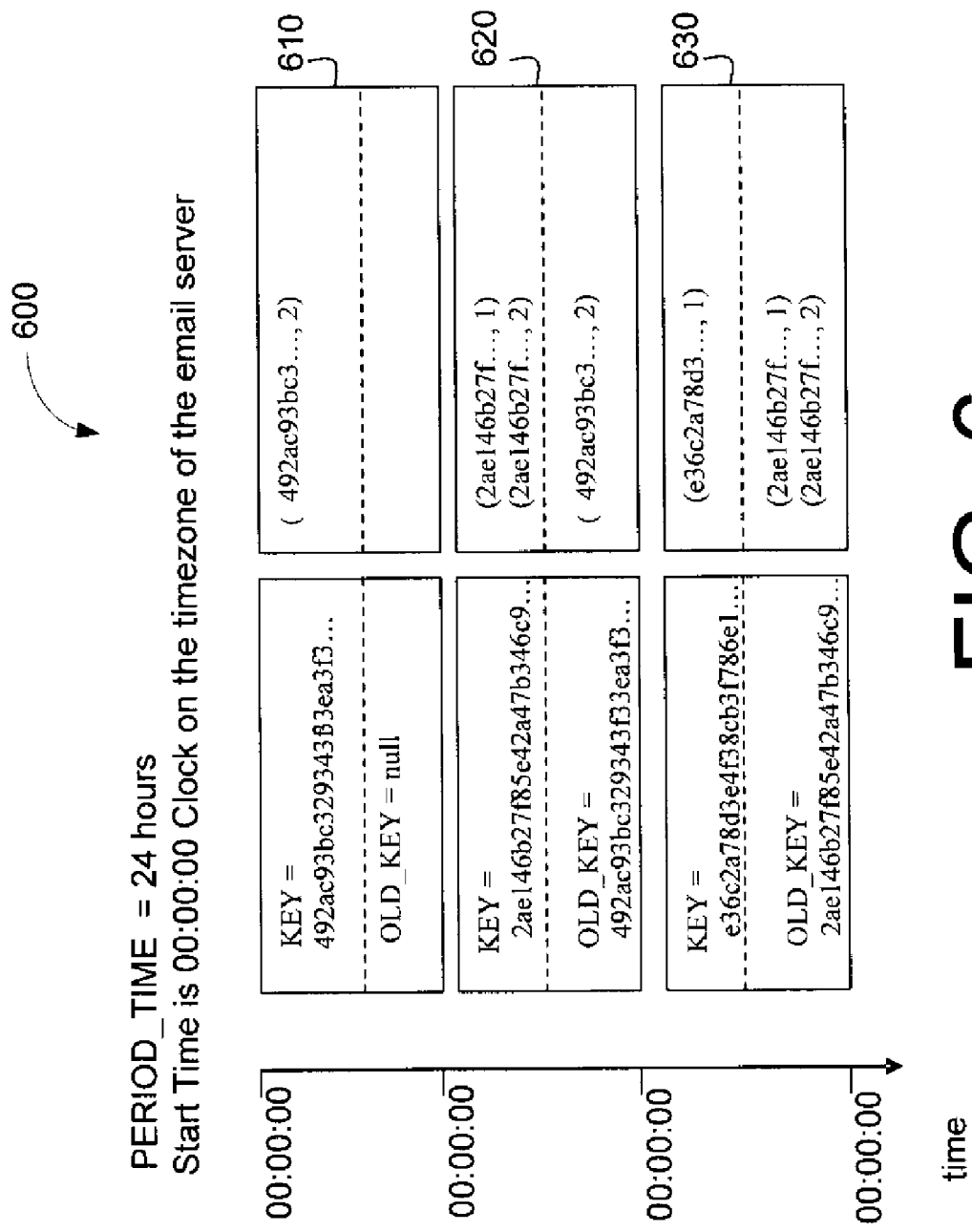
FIG. 6 is an illustrative history list of an account for storing dynamic passcode information of messages accepted for non-qualified senders, according to an example embodiment of the invention.

As described above, a non-qualified sender may include a dynamic passcode with a message that may be transmitted to a recipient. As described herein, a dynamic passcode may be obtained from a dynamic passcode provider such as dynamic passcode provider 135. The recipient's node/exchange entity that verifies the received passcode may store, perhaps in a memory or database, a history list of previously accepted passcodes for an account. FIG. 6 illustrates an example of a history list of an account that is used to store the dynamic passcode information of the messages accepted for non-qualified senders. According to an example embodiment of the invention, the history list of an account may allow the recipient's node/exchange entity to reject messages that utilize dynamic passcodes that have previously been accepted by the node/exchange entity. Accordingly, a particular dynamic passcode may be limited to a single use, according to an example embodiment of the invention.

Because different dynamic passcodes may be determined based upon distinct pairs of secret keys and a counter, as described herein, the history list may include previously accepted passcodes generated from pairs with format (KEYV, COUNTER) as illustratively shown in blocks 610, 620, 630 of FIG. 6, where KEYV may be the value of the secret key KEY, or the value of the old secret key OLD_KEY of the node/exchange entity, and COUNTER may be a decimal number used in creating and verifying the dynamic passcode with the paired KEYV.

According to an example embodiment of the invention, when a received message, which includes a dynamic passcode comprising key K and counter C, is accepted by a node/exchange entity for the account, the pair (K, C) may be inserted in the history list of that account. It will be appreciated that the size of the history list may not increase proportionally as time goes on, according to an example embodiment of the invention. In particular, upon replacing the system old key OLD_KEY in a new time period, the node/exchange entity may delete all pairs (K, C), associated the old key of OLD_KEY, of all accounts registered at the node/exchange entity.

According to an example embodiment of the invention, a message received from a non-qualified sender may be rejected by the node/exchange entity for the destination account if the message includes the dynamic passcode made of secret key K and counter C, and the pair (K, C) that is already provided in the history list of that account. In this case, if the pair (K, C) is provided in the history list of that account, then the dynamic passcode is already been used previously, according to an example embodiment of the invention.

Referring now to FIG. 6, according to an example embodiment of the invention, a history list in block 610 may include one pair (492ac93bc3 . . . , 2) at a first time period when system key KEY="492ac93bc329343f33ea3f3 . . . " and OLD_KEY=null. In block 620, the history list may include pairs (2ae146b27f . . . , 1), (2ae146b27f . . . , 2) and (492ac93bc3 . . . , 2) at second time period when KEY="2ae146b27f85e42a47b346c9 . . . " and OLD_KEY="492ac93bc329343f33ea33 . . . ". When KEY="e36c2a78d3e4f38cb3f786e1 . . . " and OLD_KEY="2ae146b27f85e42a47b346c9 . . . " in a third time period, the history list in block 630 may include pairs (e36c2a78d3 . . . , 1), (2ae146b27f . . . , 1) and (2ae146b27f . . . , 2) associated only with current KEY and OLD_KEY. The pair (492ac93bc3 . . . , 2) associated with the old value of OLD_KEY may be deleted, according to an example embodiment of the invention. Accordingly, the size of a history list may be maintained at a manageable size, according to an example embodiment of the invention.

VII. Distinguishing Qualified Senders or Non-Qualified Senders

As described above, a node/exchange entity may receive an incoming message for a destination account. The node/exchange entity may determine whether the sender of the incoming message is a qualified sender or non-qualified sender for the destination account. According to an example embodiment of the invention, depending on whether the sender is qualified or non-qualified, the incoming message may then be filtered in different approaches described herein to either accept or reject the message.

According to an example embodiment of the invention, a sender of an incoming message may be classified by the destination account as a qualified sender based upon one or more of the following:
1) The static destination email address embedded in the dynamic destination email address matches one profile record on qualified static address 511 of the destination account,
2) the direction type 519 of the matched record has value INCOMING_QUALIFIED or MUTUAL_QUALIFIED; and
3) the matched record is not expired based upon the expiration date 525.

Otherwise, the sender of the incoming message may be classified as a non-qualified sender.

According to another example embodiment of the invention, when a sender sends an outgoing message from a source account to a destination account, the sender may be classified as a qualified sender to the destination account by the sender's node/exchange entity based upon one or more of the following:
1) the source address of the outgoing message matches one of the qualified static addresses 511 in a graylist profile record 510 of the source account;
2) the direction type 519 of the matched record has value OUTGOING_QUALIFIED or MUTUAL_QUALIFIED and
3) the matched record is not expired based upon the expiration date 525.

Otherwise, the sender of the outgoing message may classified as a non-qualified sender to the destination account.

For qualified sender of an outgoing message, a dynamic signature may be automatically generated by a client program or node/exchange entity for the source account, and added or embedded in the outgoing message, perhaps in a designated field, according to an example embodiment of the invention. According to an example embodiment of the invention, the dynamic signature may be determined by applying the local hashing function 523 to the local seed 520 and the local index 521 as described herein. According to an example embodiment of the invention, some outgoing messages such as email may include multiple destination addresses. In this situation, the corresponding multiple dynamic signatures may be generated and added into the outgoing message in this case. For a non-qualified sender of an outgoing message, the sender may be informed that he may need to manually search or obtain the dynamic passcode of the destination account from a dynamic passcode provider such as a public Web site or interactive voice response (IVR) system. According to an example embodiment of the invention, the non-qualified sender may be provided with a universal resource locator (URL) or hyperlink of the public website or telephone number for the IVR system. The non-qualified sender may then interact with the public website, IVR, or other dynamic passcode provider to obtain a dynamic passcode of the destination account, according to an example embodiment of the invention.

VIII. Obtaining Dynamic Passcode from a Web Service

As described above, a non-qualified sender may need to obtain a dynamic passcode of the destination account from a dynamic passcode provider such as a public Web site. The non-qualified sender may then include the obtained dynamic passcode of the destination account in the message to be sent in order to successfully deliver the message to the destination account.

According to an example embodiment of the invention, a dynamic passcode provider associated with the node/exchange entity may store all static addresses of the destination accounts registered with the node/exchange entity into an address book (e.g., ADDRESS_BOOK). Each entry of the address book may include a counter (e.g., COUNTER), which may be initialized, perhaps to 0 or an initial value, according to an example embodiment of the invention. The system hashing function H of the dynamic passcode provider may also be the same as that utilized by the node/exchange entity in an example embodiment of the invention.

According to an example embodiment of the invention, the dynamic passcode provider may store the KEY of the node/exchange entity into a field such as a web key field (e.g., WEB_KEY). According to an example embodiment of the invention, once a new KEY is created at the corresponding node/exchange entity, the KEY value may be transmitted to the dynamic passcode provider (e.g., a Web service) from a communications channel (e.g., a secure channel), and stored as a WEB_KEY value.

According to an example embodiment of the invention, the dynamic passcode provider may also store a query pre-charge indicator for each account. The query pre-charge indicator for each account on the dynamic passcode provider may be synchronized with a similar pre-charge indicator for each account in the node/exchange entity. As will be described in further detail below, the query pre-charge indicator may have a value of NONYES or 0/1, according to an example embodiment of the invention. A value of "NO" or "0" may indicate that the non-qualified sender would not be pre-charged for performing a query on the dynamic passcode provider for a destination account. On the other hand, a value of "YES" or "1" may indicate that the non-qualified sender may be pre-charged for performing a query on the dynamic passcode provider for the destination account. According to an example embodiment of the invention, if the non-qualified sender is to be pre-charged for performing a query and obtaining a dynamic passcode, the payment may be made from an account funded by the non-qualified sender. If the recipient receives the message with the dynamic passcode, and the message is not spam, then the non-qualified sender may be refunded the pre-charge amount. Accordingly, the use of the pre-charge may increase the costs for and otherwise deter spammers or unauthorized senders attempting to obtain dynamic passcodes.

According to an example embodiment of the invention, the counter of each entry in the ADDRESS_BOOK may be initialized (e.g., set to 0) each time the WEB_KEY is changed. The counter of an entry in the ADDRESS_BOOK may be increased (e.g., increased by 1) after the dynamic passcode provider generates a new dynamic passcode associated with the static address of the entry.

Figure 7:
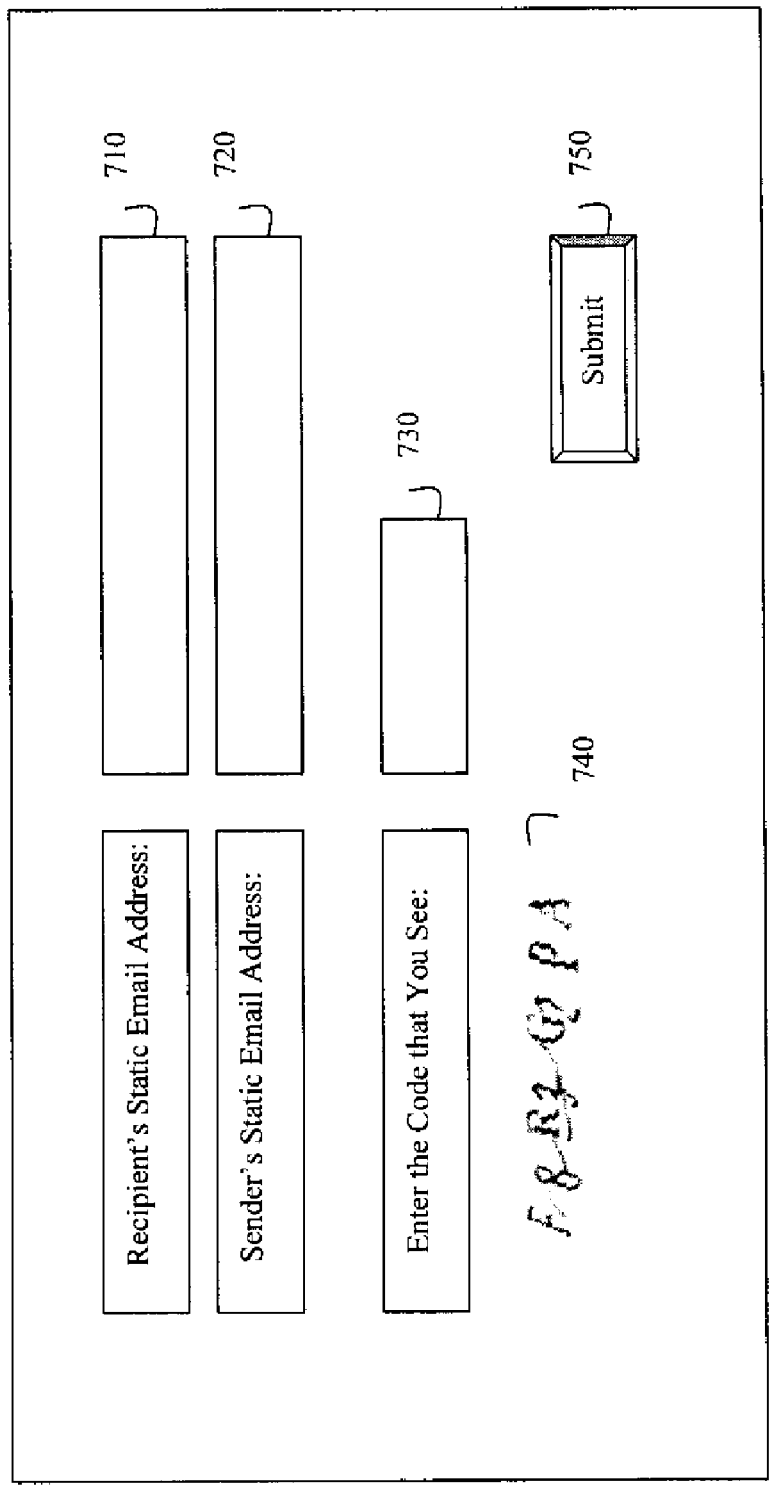
FIG. 7 provides an illustrative query Web page for searching for a passcode for email communications, according to an example embodiment of the invention.

According to an example embodiment of the invention, a non-qualified sender may obtain the dynamic passcode of the destination account from the query Web page of the Web service that is the dynamic passcode provider. FIG. 7 provides an illustrative query Web page for searching for a passcode for email communications, according to an example embodiment of the invention. As shown in FIG. 7, according to an example embodiment of the invention, the sender may enter the recipient's static email address in block 710 and the sender's own static email address in block 720. According to an embodiment of the invention, the sender may also need to enter into human verification block 730 the code shown in block 740 as part of a human interactive proof. The human verification block 730 may prevent or deter computerized scripts or robots from automatically harvesting dynamic passcodes for use in sending spam.

According to an example embodiment of the invention, in response to clicking a submit button 750 in FIG. 7 by the sender, the dynamic passcode provider may verify the correctness of the code entered in human verification block 730. If the code entered in the human verification block 730 does not match or substantially match the code in block 740, then the query may be rejected, according to an example embodiment of the invention.

On the other hand, if the code entered in the human verification block 730 matches or substantially matches the code in block 740, then the dynamic passcode provider may search the static email addresses stored in ADDRESS_BOOK to match the recipient's static email address entered in block 710. The query may be rejected if no static email addresses in the ADDRESS_BOOK matches the recipient's static email address. However, if a match is found, then the dynamic passcode provider may select the current counter value (e.g., COUNTER) of the matched static email address.

According to an example embodiment of the invention, the dynamic passcode provider may then compute a dynamic code, perhaps of a fixed length, by applying to a hashing function H to a concatenated parameter string. According to an example embodiment of the invention, the concatenated parameter string may be comprised of a WEB_KEY, the recipient's static email address, the sender's static email address, and the selected counter value (e.g., COUNTER). It will be appreciated that the dynamic code may be provided in a fixed length by applying an exclusive-OR on multiple-folded string for reducing the length of the hash value or by computing the congruent of the hash value. Once the dynamic passcode provider determines the dynamic code, the dynamic passcode provider may form the dynamic passcode by concatenating the dynamic code and the counter value (e.g., COUNTER). The dynamic passcode may then be returned or otherwise provided to the user, perhaps on a Web page, by the dynamic passcode provider.

It will be appreciated that the human interactive proof described herein can be embodied in different forms without departing from embodiments of the invention. According to an alternative embodiment of the invention, the human interactive proof may involve recognizing a piece of noisy speech. It will also be appreciated that while the dynamic passcode provider has been described above as a Web service, it can likewise be implemented using an IVR system or other similar answering system. With the IVR system, a toll free number may be provided for the user to interact (e.g., provide static addresses to, etc.) with the IVR system, according to an example embodiment of the invention.

IX. Filtering Incoming Messages by a Node/Exchange Entity

A. Qualified Senders

According to an example embodiment of the invention, upon receiving the incoming message and determining the sender as a qualified sender, the node/exchange entity of the recipient may authenticate the sender. The message may be accepted if the sender is authenticated successfully by the node/exchange entity. Otherwise the sender may be reclassified as a non-qualified sender for passcode verification in case of the passcode usage by a qualified sender.

According to an example embodiment of the invention, the dynamic signature in the received message may be stored in a "Dynamic tag" field or otherwise embedded in the field of the incoming message. The node/exchange entity may obtain the dynamic signature from the incoming message. As described above, the dynamic signature may include a dynamic code (e.g., DC) and a counter (e.g., COUNTER). According to an example embodiment of the invention, the dynamic signature may be of a predefined fixed length. In addition to obtaining the dynamic signature from the incoming message, the node/exchange entity may also retrieve the graylist profile such that: (1) the account of the graylist matches the static destination address of the incoming message, and (2) the graylist profile record 510 has a qualified static address 511 matching the static source address of the incoming message.

Assuming that a graylist profile record 510 having a qualified static address 511 matching the static source address of the incoming message, then the node/exchange entity may proceed to authenticate the qualified sender of the incoming message. According to an example embodiment of the invention, the node/exchange entity may compute a reference seed based upon the attributes of the matched graylist profile record 510 as follows: (1) set the reference seed as the qualified seed 512 if the counter obtained from the dynamic signature is larger than the qualified index 513, but is smaller than or equal to the qualified maximum index 514, or (2) set the reference seed as QUALIFIED_CHAIN (QUALIFIED_SEED), where QUALIFIED_CHAIN is the qualified chaining function 516 and QUALIFIED_SEED is the qualified seed 512, if the counter obtained from the dynamic signature is smaller than or equal to the qualified index 513. A fixed length verifier dynamic code (e.g., VDC) may be computed by applying the qualified hashing function 515 (e.g., QUALIFIED_HASH) to a concatenated parameter string comprising the reference seed and the counter from the dynamic signature of the incoming message. The qualified sender may be authenticated if the dynamic code (e.g., DC) of the dynamic signature from the incoming message matches the verifier dynamic code (e.g., VDC) computed by the node/exchange entity. On the other hand, if the qualified sender cannot be authenticated, then the qualified sender may be reclassified as a non-qualified sender.

It will be also appreciated that at least a portion of the message, or its digest, may be concatenated in a parameter string of a hash function to generate and verify the dynamic code. This may prevent a spammer from replacing the body of the transmitting message but keeping the addresses in a "man-in-the-middle" (MITM) attack, according to an example embodiment of the invention.

According to an example embodiment of the invention, the qualified sender of the incoming message may also be reclassified as a non-qualified sender if any of the following conditions are met: (1) the matched graylist profile record 510 is expired according to the expiration date 525; (2) the number of messages accepted this time period 518 has reached the maximum number of accepted messages this time period 517 in the matched graylist profile record; or (3) the counter of the dynamic signature of the incoming message is larger than qualified maximum index 514 of the matched record. Once the incoming message is accepted for delivery to the recipient account, the corresponding QUALIFIED_SEED 512 may be set to be the reference seed if they are different, the corresponding QUALIFIED_INDEX 513 is set to be the counter, and the number of messages accepted this time period 518 is increased by 1 or another increment, according to an example embodiment of the invention. If a qualified sender is reclassified as a non-qualified sender, then dynamic passcode verification may be performed to the incoming message as described below in accordance with an example embodiment of the invention.

B. Non-qualified Senders

In response to the incoming message sent by a non-qualified sender, the node/exchange entity for the recipient may verify the dynamic passcode in the message. According to an example embodiment of the invention, the incoming message may be accepted for delivery to the recipient's account if the passcode is verified. On the other hand, the incoming message may be rejected if the passcode cannot be verified, according to an example embodiment of the invention.

According to an embodiment of the invention, the dynamic passcode from the incoming message may be obtained by the node/exchange entity for the recipient account. The dynamic passcode may include a dynamic code (e.g., DC) and a counter (e.g., COUNTER), according to an example embodiment of the invention. The dynamic code of the dynamic passcode may be of a predetermined fixed-length according to an example embodiment of the invention. In general, the dynamic passcode is not of fixed-length since the counter may be increased, according to an example embodiment of the invention.

Once the node/exchange entity obtains the dynamic passcode, and in particular, the component dynamic code and the counter, the node/exchange entity may compute a fixed-length verifier dynamic code (e.g., VDC_KEY) by apply the system hashing function H to a concatenated parameter string comprising the current secret key (e.g., KEY), the static address of the recipient account, the static source address of the incoming message, and the counter (e.g., COUNTER).

It will be appreciated that it is possible for a non-qualified senders to obtain a passcode from the dynamic passcode provider (e.g., Web service) in a prior time period in terms of the system key iteration. The fixed-length verifier dynamic code (e.g., VDC_OLDKEY) may be computed by using the system hashing function H based on the parameter string concatenated with the secret key OLD_KEY, the static address of the account, the static source address of the incoming message, and the counter (e.g., COUNTER).

The incoming message may be accepted if either of the verifier dynamic codes VDC_KEY or VDC_OLDKEY matches the dynamic code (e.g., DC) obtained from the dynamic passcode of the incoming message, according to an example embodiment of the invention. On the other hand, the incoming message may be rejected if none of the verifier dynamic codes VDC_KEY and VDC_OLDKEY match the dynamic code (e.g., DC) obtained from the dynamic passcode. In this case, the age of the dynamic passcode may be longer than twice of the system time period (e.g., PERIOD_TIME), which may render the passcode invalid, according to an example embodiment of the invention.

In addition, according to an example embodiment of the invention, the incoming message may be rejected if the verifier dynamic code (e.g., VDC_KEY) matches the dynamic code (e.g., DC), but the pair (KEY, COUNTER) is already listed in the history list 600 of the recipient account. Likewise, the incoming message may be rejected if the prior verifier dynamic code (e.g., VDC_OLDKEY) matches the dynamic code (e.g., DC), but pair (OLDKEY, COUNTER) is in the history list of the account. In either of these situations, the history list 600 may indicate that the passcode has been previously accepted, thereby resulting in the incoming message being rejected.

On the other hand, the incoming message may be accepted if the verifier dynamic code (e.g., VDC_KEY) is the same as the dynamic code (e.g., DC) obtained from the dynamic passcode of the incoming message, but where the pair (KEY, COUNTER) is not in the history list 600 of the recipient account. Likewise, the incoming message may also be accepted if the prior verifier dynamic code (e.g., VDC_OLD-KEY) is the same as the dynamic code (e.g., DC), where the pair (OLD_KEY, COUNTER) is not in the history list of the account. Once the incoming message is accepted for delivery to the recipient account, the pair (KEY, COUNTER) or (OLD_KEY, COUNTER) may be added into the history list 600 of the recipient account as described herein, according to an example embodiment of the invention.

According to an example embodiment, a pre-charge as described herein may have been required in order for a non-qualified sender to obtain a dynamic passcode from the dynamic passcode provider. As described herein, the pre-charge may be required if the pre-charge indicator associated with the recipient account has a value of "YES" or "1". According to an example embodiment of the invention, the query pre-charge fee for the non-qualified sender may be refunded by default if the delivered message is not spam. According to another example embodiment of the invention, the recipient may need to provide an indicator to the recipient's node/exchange entity in order to release or refund the query pre-charge fee.

X. Sending and Accepting Emails for Senders

A. Qualified Senders

According to an example embodiment of the invention, a dynamic tag may be embedded in the destination account address of the message. As an example, the dynamic tag may be embedded in the destination email address in the field "To" and/or "Cc" of the email message to form a dynamic destination address, according to an example embodiment of the invention. With the use of a dynamic tag in a dynamic destination address, an MTA may be able to filter email spam sent by non-qualified senders from other MTAs that do not support dynamic tag but use other authentication technologies, such as DomainKeys, to sign the outgoing emails. According to an example embodiment of the invention, it may be appreciated that a recipient's MTA may be able to filter email spam immediately after it received "MAIL FROM" and "RCPT TO" commands from the sender if dynamic destination email address is utilized in "RCPT TO" command in Simple Mail Transfer Protocol or another similar protocol. In this case, the spam may be blocked before it is sent. While dynamic tag field approach must see at least the tag field, so the entire message must be transmitted.

Figure 8:
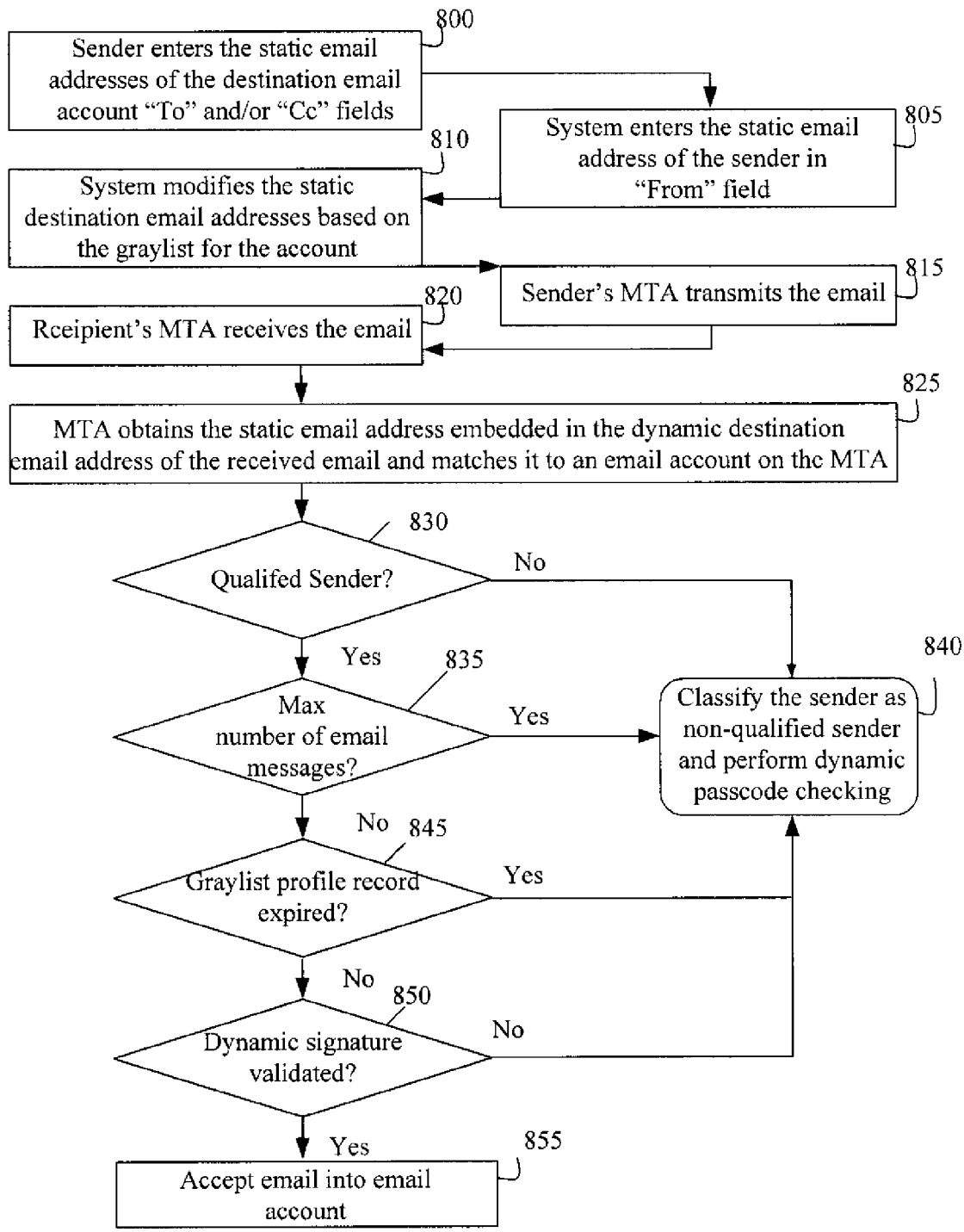
FIG. 8 illustrates a flow diagram for transmitting and receiving messages from qualified senders, according to an example embodiment in the invention.

FIG. 8 illustrates a flow diagram for transmitting and receiving messages from qualified senders, according to an example embodiment in the invention. In the flow diagram of FIG. 8, both the sender's MTA and the recipient's MTA are configured to support dynamic email addresses having dynamic tags, as described herein.

In block 800 of FIG. 8, a qualified sender for a destination email account enters the static email address of the destination email account into the "To" or "Cc" destination field of the header of an outgoing email, according to an example embodiment of the invention. In other embodiments of the invention, the qualified sender may provide multiple destination email addresses within a single outgoing email addresses. In block 805, the qualified sender's client program that is in communication with the sender's MTA may provide the qualified sender's static email address in the "From" source field.

In block 810, the client program in communication with the qualified sender's MTA may determine if the sender identified by the "From" source field is a qualified sender with respect to one or more of the static destination email addresses in the outgoing email. As described herein, the sender may be a qualified sender to the static destination email address if (1) the static destination address matches one of the qualified static address attributes in a graylist profile record of the account owned by the sender; (2) the direction type of the matched graylist profile record includes a value of OUTGOING_QUALIFIED or MUTUAL_QUALIFIED; and (3) the matched graylist profile record is not expired. Upon passing the qualified sender checking, the sender's client program or MTA may automatically compute the dynamic signature for each destination email address, and embed the dynamic signature into the corresponding static destination email address.

On the other hand, if the sender is not determined to be a qualified sender to a particular static destination email address, then the sender may be notified to obtain a dynamic passcode. For example, the destination email address in the client program may be changed in display format such as font color, font size, or font type, so that the sender is reminded to get the dynamic passcode of the destination email address. It will be appreciated that in alternative embodiments of the invention, one or more steps of block 810 may be performed by the sender's MTA instead of the sender's client program.

According to example embodiment of the invention, the dynamic signature may be computed by the client program or MTA using information obtained from the outgoing email and the graylist profile record having a qualified static address matching the static destination address (e.g., DESTINATION_ADDRESS) of the outgoing email address. Initially, the static destination address (e.g., DESTINATION_ADDRESS) of the outgoing email may be obtained. The local seed (e.g., LOCAL_SEED), local index (e.g., LOCAL_INDEX), local maximum index (e.g., LOCAL_MAXINDEX), local hash function (e.g., LOCAL_HASH), and local chain function (e.g., LOCAL_CHAIN) may be obtained from the matched graylist profile record. Next, if the local index (e.g., LOCAL_INDEX) is the same as the local max index (e.g., LOCAL_MAXINDEX), then the current LOCAL_SEED has used the maximum times allowed. A new local seed (e.g., LOCAL_SEED) may be generated by applying the local chaining function (e.g. LOCAL_CHAIN) to the current local seed (e.g., LOCAL_SEED) according to LOCAL_CHAIN (LOCAL_SEED). Likewise, and the LOCAL_INDEX may be reset, perhaps to a value of 1, according to an example embodiment of the invention. On the other hand, if the local index (e.g., LOCAL_INDEX) is smaller than LOCAL_MAXINDEX, the local index (e.g., LOCAL_INDEX) may be incremented, perhaps to LOCAL_INDEX+1, and the local seed (e.g., LOCAL_SEED) may remain unchanged, according to an example embodiment of the invention. A fixed length dynamic code (e.g., DC) may then be obtained using the local hashing function (e.g., LOCAL_HASH) to hash the string concatenated with the local seed (e.g., LOCAL_SEED, and the local index (e.g., LOCAL_INDEX). According to an example embodiment of the invention, a dynamic signature may be obtained by concatenated the dynamic code (e.g., DC) with the local index (e.g., LOCAL_INDEX). A dynamic destination email address in accordance with an example embodiment of the invention may then be generated by embedding the dynamic signature into the static destination email address, as illustratively described by dynamic email address 420 in FIG. 4A. In block 810, all static destination email addresses in the header of the email may be automatically replaced with their corresponding dynamic destination email addresses by the sender's client program or MTA.

In block 815, the sender's MTA may transmit the email with the dynamic destination email address. According to an example embodiment of the invention, the sender's MTA may transmit the email utilizing a "RCPT TO" command based on the original static destination email address embedded in the dynamic destination email address, or based on the newly generated dynamic destination email address. According to an example embodiment of the invention, after sending the outgoing email with the dynamic signature, the local index (e.g., LOCAL_INDEX) for each destination email address may be updated, perhaps by being increased by 1 or reset value. Furthermore, the local seed (e.g., LOCAL_SEED) for each destination email address may be updated if it recomputed by local chaining function, according to an example embodiment of the invention.

Still referring to FIG. 8, in block 820, the recipient's MTA may receive the transmitted email. In block 825, the recipient's MTA may obtain the static email address embedded in the dynamic destination email address and match it with an email account on the recipient's MTA. In block 830, the recipient's MTA may determine whether the sender of the email is a qualified sender for the matched email account on the recipient's MTA. According to an example embodiment of the invention, the recipient's MTA may determine a qualified sender by determining whether a graylist profile record with a qualified static address corresponding to the static email address of the sender of the incoming email can be located. If a match is found in a graylist profile record, then the sender may be considered a qualified sender and the process may proceed with block 835. Otherwise, the sender may be considered a non-qualified sender in block 840 and dynamic passcode checking may be performed such as that illustratively described in FIG. 9.

In block 835, the recipient's MTA may utilize the matched graylist profile record to determine whether the sending limitation restriction for the qualified sender has been exceeded. If the number of accepted messages for the particular time period (e.g., month, year, etc.) is at the maximum number of accepted messages per time period, then processing may proceed with block 840, and the sender may be able to send email to this recipient account as a non-qualified sender as described herein.

On the other hand, if in block 835, the number of accepted messages for the particular time period does not exceed the maximum number of accepted messages, then the expiration date of the matched graylist profile record may be checked in block 845. If the graylist profile record is determined to be expired in block 845, then processing may continue with block 840, as described above. On the other hand, if the graylist profile record is not determined to be expired in block 845, then processing may proceed with block 850 verifying or validating the dynamic signature.

In block 850, the dynamic signature may be obtained from the received email and the counter (e.g., COUNTER) may be obtained from the dynamic signature. In addition, the qualified maximum index (e.g., QUALIFIED_MAXINDEX), the qualified seed (e.g., QUALIFIED_SEED), the qualified chaining function (e.g., QUALIFIED_CHAIN), and the qualified hashing function (e.g., QUALIFIED_HASH) from the corresponding graylist profile record are obtained. If the counter (e.g., COUNTER) from the dynamic signature is larger than the qualified maximum index (e.g., QUALIFIED_MAXINDEX), then the sender may be using an invalid counter to construct the dynamic signature, and processing may proceed with block 840 as described above. Otherwise, if the counter (e.g., COUNTER) is smaller than or equal to the qualified index (e.g., QUALIFIED_INDEX), then the reference seed (e.g., REFERENCE SEED), which may be set as the qualified seed by default, may be redetermined or recomputed by applying the qualified chaining function (e.g., QUALIFIED_CHAIN) to the qualified seed (e.g., QUALIFER SEED), perhaps according to QUALIFIED_CHAIN (QUALIFIED_SEED). A fixed-length verifier dynamic code (e.g., VDC) may be obtained by applying the qualified hashing function (e.g., QUALIFIED_HASH) to the concatenated string comprising the reference seed (e.g., REFERENCE_SEED) and the counter. In block 850, if the verifier dynamic code (e.g., VDC) is equal to the dynamic code of the dynamic signature, then processing may proceed to block 855, where the email may be accepted into the recipient account. After accepting the email with valid dynamic signature, the qualified index (e.g., QUALIFIED_INDEX) may be set to the value of the counter, the qualified seed (e.g., QUALIFIED_SEED) may be set as the value of the reference seed (e.g., REFERENCE_SEED), and the number of accepted messages in the time period may be incremented, perhaps by 1 or another increment.

It will be appreciated that many variations of the block diagram of FIG. 8 are available in accordance with other embodiments of the invention. For example, the ordering of blocks 830, 835, 845, and 850 may be interchanged without departing from embodiments of the invention. Likewise, one or more of the blocks in FIG. 8 may also be combined into a single block or separated into multiple without departing from embodiments of the invention. According to an example embodiment of the invention, the Direction type 519 value check may be performed after Block 825. It will be also appreciated that the counter in the dynamic signature could be hidden without departing from example embodiments of the invention. In such a case, the delimiter and the counter may not be explicitly shown in the dynamic signature. Accordingly, the dynamic code may implicitly contain the counter, and verifying process may exhaust all counters in a predefined range (e.g., from [QUALIFIED_INDEX+1] to [QUALIFIED_INDEX+12]) in computing all possible verifier dynamic codes (VDCs), according to an example embodiment of the invention.

B. Non-Qualified Senders

Figure 9:
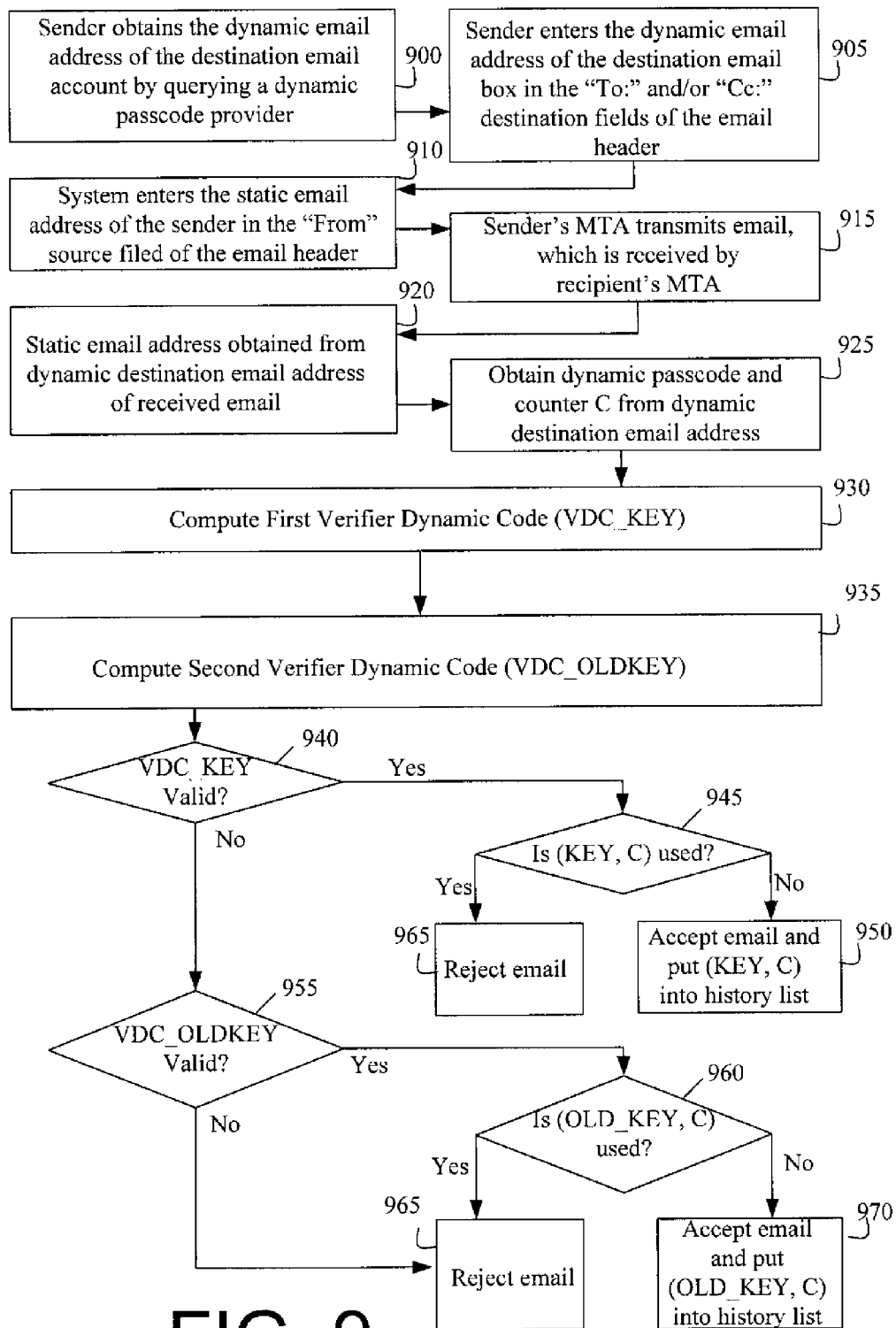
FIG. 9 is a flow diagram of an example process for sending and accepting an email with dynamic destination email addresses for non-qualified senders, according to an example embodiment of the invention.

If an email is sent by a non-qualified sender, then the dynamic passcode of the destination account may be embedded in the corresponding dynamic destination email address of the outgoing email. FIG. 9 provides an illustrative flow diagram for an example process for sending and receiving an email for non-qualified senders, according to an example embodiment of the invention.

In block 900, a non-qualified sender may obtain the dynamic destination email address, including the dynamic passcode, of the destination account by querying a dynamic passcode provider (e.g., a Web site). In block 905, the dynamic destination email address may be entered in the "To" or "Cc" destination field of the email. In block 910, the static email address of the non-qualified sender may be entered in the "From" source field.

Still referring to FIG. 9, in block 915, the sender's MTA may send the mail, perhaps using a "RCPT TO" command, based on the original static destination email address embedded in the dynamic destination email address, or based on the dynamic destination email address. The recipient's MTA may receive the transmitted email. In block 920, the recipient's MTA may obtain the static destination email address embedded in the dynamic destination email address, and may select the corresponding destination email account. In block 925, the dynamic code (e.g., DC) and the counter (e.g., C) may be obtained from the dynamic passcode of the dynamic destination email address. In block 930, the system hashing function H at the recipient's MTA may be used to determine a first fixed-length verifier dynamic code VDC_KEY by hashing a first concatenated string that may include the following or variations thereof:

system key KEY,
static email address of the account,
static email address of the sender, and
the counter C of the passcode.

It will be appreciated that the system key KEY and addresses in the concatenated parameter of the hash function may be in different orders, or in different mixing and combination patterns, without departing from example embodiments of the invention.

In block 935, the system hashing function H at the recipient's MTA may be used to determine a second fixed-length verifier dynamic code VDC_OLDKEY by hashing a second concatenated string that may include the following or variations thereof:
system key OLD_KEY,
static email address of the account,
static email address of the sender, and
the counter C of the passcode.

In block 940, the first verifier dynamic code VDC_KEY may be compared with the dynamic code DC of the dynamic passcode in the email to determine validity of the first verifier dynamic code VDC_KEY. If there is a match, then block 940 may determine whether the pair (KEY, C) is in the history list. If the pair (KEY, C) is determined to be in the history list in block 945, then the email may be rejected in block 965 since the dynamic passcode may have been used before. On the other hand, if block 945 determines that the pair (KEY, C) is not in the history list, then the email may be accepted and the pair (KEY, C) may be written to the history list.

On the other hand, if block 940 determines that the first verifier dynamic code VDC_KEY is not valid, then processing may proceed to block 955. In block 955, the second verifier dynamic code VDC_OLDKEY may be compared to the dynamic code DC of the dynamic passcode in the email. If block 955, determines that the second verifier dynamic code VDC_OLDKEY is the same as the dynamic code, then processing may proceed to block 960. If block 960 determines that the pair (OLD_KEY, C) is in the history list, then the email is rejected in block 965 since the dynamic passcode has been used before. However, if block 960 determines that the pair (OLD_KEY, C) is not in the history list, then in block 970, the email may be accepted and the pair (OLD_KEY, C) may be written to the history list of the destination account. If block 955 determines that the VDC_OLDKEY is not valid, then the email will likewise be rejected in block 965, according to an example embodiment of the invention.

It will be appreciated that in some embodiments of the invention, the sender of the email may have paid a pre-charge fee when the pre-charge indicator of the recipient account is set accordingly. In this situation, if the recipient finds the accepted message is spam, then the recipient may inform the system to charge the pre-charged fee paid by the non-qualified sender for this spam email. One of ordinary skill in the art will recognize that many variations of FIG. 9 are available without departing from example embodiments of the invention.

XI. Processing Group Emails

An email having more than one destination email addresses in its "To" and/or "Cc" destination header field may be referred to as a group email. A sender who generates the initial group email may be referred to as an originator, according to an example embodiment of the invention. According to an example embodiment of the invention, two extra header fields "Originator" and "Originator forward" may be added into the email header for conveniently replying the group emails by the group email recipients.

The "Originator" field may store the static email address of the originator, according to an example embodiment of the invention. The "Originator forward" field may store an indicator set by the group email recipients when they reply the group emails, according to an example embodiment of the invention. If the "Originator forward" field is set when a group email is replied, then the replying email may be sent only to the originator, and the dynamic tag for the originator may be needed, according to an example embodiment of the invention. When the originator accepts a replying group email with "Originator forward" field set, the MTA of the originator may automatically forward the replying group email to all others in "To" or "Cc" fields, except for the sender of the replying email, according to an example embodiment of the invention. Indeed, according to an example embodiment of the invention, this method may be useful when the originator is the qualified senders to all recipients in the group email, but these recipients may not qualified senders each other.

FIG. 10 illustrates an example flow diagram for sending, replying and forwarding a group email, according to an example embodiment of the invention. In FIG. 10, Ava may be a qualified sender to Bob, Christy, and Alice in term of their email accounts. However, Bob, Christy, and Alice may not be qualified senders to each other. Referring to FIG. 10, now Ava sends a group email to Bob, Christy, and Alice. The "Originator" field of the group email may include Ava's static email address ava@home.com, according to an example embodiment of the invention. The static destination email addresses include bob@city.com, Christy@county.com, and alice@state.com. The dynamic signatures may be added into the static destination email addresses if dynamic destination email address approach is adopted, according to an example embodiment of the invention According to another embodiment of the invention, the dynamic signatures may be stored at the extra field "Dynamic tag" of the email.

Still referring to FIG. 10, after receiving the group email with "Originator" ava@home.com, Christy may want to reply to all. In this situation, Christy may set the field "Originator forward" indicator, and reply to the group email. The MTA of Christy may send the email to originator ava@home.com only without querying the passcodes of Bob and Alice. Once the replied group email of Christy is received, the MTA of Ava may automatically forward the email to Bob and Alice with correct dynamic signatures, according to an example embodiment of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A spam-prevention method, comprising:
receiving, at an exchange entity for a recipient, an electronic message that includes a source address associated with a sender and a dynamic tag, wherein the dynamic tag includes a first dynamic code and a counter;
locating a hashing function and a secret key;
determining a second dynamic code using at least the hashing function, the secret key, and the counter of the dynamic tag;

verifying the dynamic tag by matching the first dynamic code of the dynamic tag to the second dynamic code; and accepting the electronic message to an account of the recipient upon verifying at least the dynamic tag, wherein the sender is a non-qualified sender, wherein the dynamic tag is a dynamic passcode, wherein locating the hashing function and the secret key includes locating a system hashing function and a system key, and wherein the dynamic passcode is obtained by the non-qualified sender manually querying a public dynamic passcode provider, wherein the dynamic passcode provider is a Web server, and querying the dynamic passcode provider includes the non-qualified sender entering at least a static email address of the recipient and completing a human interactive proof, wherein the dynamic passcode is generated by the dynamic passcode provider applying the system hashing function to a concatenated string comprising at least a portion of the static email address of the recipient, the system key, and an incremental counter associated with the recipient, wherein the prior steps are performed by one or more computers.

2. The method of claim 1, further comprising:

receiving, at the exchange entity for the recipient, a second electronic message that includes a second source address associated with a second sender and a second dynamic tag, wherein the second dynamic tag includes a third dynamic code and a second counter;

locating a second hashing function and a second secret key;

determining a fourth dynamic code using at least the second hashing function, the second secret key, and the second counter of the second dynamic tag;

verifying the second dynamic tag by matching the third dynamic code of the second dynamic tag to the fourth dynamic code; and accepting the second electronic message to the account of the recipient upon verifying at least the second dynamic tag, wherein the second sender is a qualified sender, wherein the second secret key is a qualified seed, and wherein locating the second hashing function and the second secret key includes locating the second hashing function and the qualified seed in a profile record associated with the qualified sender of the electronic message in a gray-list identifying qualified senders.

3. The method of claim 2, wherein the profile record includes a qualified address of the qualified sender, and wherein the profile record is located based at least in part on the source address matching at least a portion of the qualified address.

4. The method of claim 2, wherein accepting the electronic message includes accepting the electronic message upon additionally verifying one or both of (i) the profile record is not expired, and (ii) a limit on the number of accepted messages within a time period has not been exceeded.

5. The method of claim 2, wherein the profile record includes a chaining function, and further comprising:

subsequent to verifying the first dynamic code of the dynamic tag, updating the qualified seed by applying the chaining function to a current value of the qualified seed, wherein the prior step is performed by one or more computers.

6. The method of claim 2, wherein the profile record includes a chaining function, a previously accepted counter value, and a predefined maximum counter value, and further comprising:

applying the chaining function to a current value of the qualified seed to obtain an updated value for the qualified seed when the second counter of the second dynamic tag is less than or equal to the previously accepted counter values, wherein the prior step is performed by one or more computers.

7. The method of claim 6, wherein the second counter of the second dynamic tag is less than or equal to the previously accepted counter value, and wherein the fourth dynamic code is determined using the updated value for the qualified seed.

8. The method of claim 1, wherein querying the dynamic passcode provider further includes the non-qualified sender further entering a static email address of the sender, wherein the concatenated string further comprises at least a portion of the static email address of the sender.

9. The method of claim 1, wherein the sender is pre-charged a fee for querying the dynamic passcode provider to obtain the dynamic passcode, and further comprising:

returning the pre-charged fee to the second sender if the second electronic message accepted into the account of the recipient is not spam; and providing the pre-charged fee to the recipient if the second electronic message accepted into the account of the recipient is spam, wherein the prior steps are performed by one or more computers.

10. The method of claim 1, wherein the counter is a first counter, and further comprising:

transmitting, to the dynamic passcode provider, the system key, the system hashing function, and an identification of recipient accounts at the exchange entity, wherein the dynamic passcode provider generates dynamic passcodes based upon queries of a static destination email addresses that corresponds to recipient accounts at the exchange entity, wherein the dynamic passcodes are based at least in part upon the system key, the system hashing function and a second counter stored in association with the static destination email address.

11. The method of claim 10, further comprising:

upon accepting the electronic message, updating a history list with the system key and the second counter, wherein the history list is utilized for enforcing limited use of dynamic passcodes within a time period; and upon accepting the electronic message, updating the system key randomly in a predefined time period.

12. The method of claim 1, wherein the electronic message is received over a network, wherein the network is an email network, a public switched telephone (PSTN) network, a cellular phone network, and session initiation protocol (SIP) communication network.

13. The method of claim 1, wherein the electronic message includes a dynamic destination address associated with the recipient, wherein the dynamic destination address includes the dynamic tag.

14. The method of claim 13, wherein the dynamic destination address is a dynamic destination email address that comprises:

a local-part string of a static email address of the recipient;

a domain string of the static email address of the recipient; and the dynamic tag.

15. The method of claim 1, wherein the hashing function is a first hashing function, the secret key is a first secret key, the counter is a first counter, and wherein the dynamic tag is generated by applying a second hashing function to a second secret key and a second counter, wherein the second hashing function, the second secret key, and the second counter are maintained by the sender or a representative of the sender.

16. A system, comprising:
a memory for storing data and computer-executable instructions;
a processor in communication with the memory, wherein the processor is operative to execute the computer-executable instructions to:
receive an electronic message addressed to a recipient, wherein the electronic message includes a source address associated with a sender and a dynamic tag, wherein the dynamic tag includes a first dynamic code and a counter;
retrieve a hashing function and a secret key stored in the memory;
compute a second dynamic code using at least the hashing function, the secret key, and the counter of the dynamic tag;
verify the dynamic tag by matching the first dynamic code of the dynamic tag to the computed second dynamic code; and
accept the electronic message to an account of the recipient upon verifying at least the dynamic tag,
wherein the sender is a non-qualified sender, wherein the dynamic tag is a dynamic passcode, wherein the processor is operative to retrieve a system hashing function and a system key as the respective hashing function and the secret key, wherein the dynamic passcode is obtained by the non-qualified sender manually querying a public dynamic passcode provider,
wherein the dynamic passcode provider is a Web server, and querying the dynamic passcode provider includes the non-qualified sender entering at least a static email address of the recipient and completing a human interactive proof, wherein the dynamic passcode is generated by the dynamic passcode provider applying the system hashing function to a concatenated string comprising at least a portion of the static email address of the recipient, the system key, and an incremental counter associated with the recipient.

17. The system of claim 16, wherein the sender is a qualified sender, wherein the secret key is a qualified seed, and wherein the processor is operative to execute the computer-executable instructions to:
receive a second electronic message addressed to the recipient that includes a second source address associated with a second sender and a second dynamic tag, wherein the second dynamic tag includes a third dynamic code and a second counter;
locate a second hashing function and a second secret key;
determine a fourth dynamic code using at least the second hashing function, the second secret key, and the second counter of the second dynamic tag;
verify the second dynamic tag by matching the third dynamic code of the second dynamic tag to the fourth dynamic code;
accept the second electronic message to the account of the recipient upon verifying at least the second dynamic tag,
wherein the second hashing function and the second secret key is located by retrieving the hashing function and the qualified seed from a profile record of a graylist identifying qualified senders, wherein the profile record is associated with the qualified sender of the second electronic message.

18. The system of claim 16, wherein the sender is pre-charged a fee for querying the dynamic passcode provider to obtain the dynamic passcode, and wherein the processor is further operative to execute the computer-executable instructions to:
return the pre-charged fee to the second sender if the recipient if the second electronic message accepted into the account of the recipient is not spam; and
provide the pre-charged fee to the recipient if the second electronic message accepted into the account of the recipient is spam.

19. The system of claim 16, wherein the processor is further operative to execute the computer-executable instructions to:
transmit, to the dynamic passcode provider, the system key, the system hashing function, and an identification of recipient accounts at the exchange entity, wherein the dynamic passcode provider generates dynamic passcodes based upon queries of a static destination email addresses that corresponds to recipient accounts at the exchange entity, wherein the dynamic passcodes are based at least in part upon the system key and the system hashing function.

20. The system of claim 19, wherein the processor is further configured to execute the computer-executable instructions to:
upon accepting the second electronic message, update a history list with the system key and the second counter, wherein the history list is utilized for enforcing limited use of dynamic passcodes within a time period; and
upon accepting the second electronic message, update the system key randomly in a predefined time period.

21. The system of claim 16, wherein the electronic message includes a dynamic destination address associated with the recipient, wherein the dynamic destination address includes the dynamic tag.

22. A spam-prevention method, comprising:
receiving, at an exchange entity for a recipient, an electronic message that includes a source address associated with a sender and a dynamic tag, wherein the dynamic tag includes a first dynamic code and a first counter;
locating a hashing function and a secret key;
determining a second dynamic code using at least the hashing function, the secret key, and the first counter of the dynamic tag;
verifying the dynamic tag by matching the first dynamic code of the dynamic tag to the second dynamic code;
accepting the electronic message to an account of the recipient upon verifying at least the dynamic tag, wherein the sender is a non-qualified sender, wherein the dynamic tag is a dynamic passcode, wherein locating the hashing function and the secret key includes locating a system hashing function and a system key, and wherein the dynamic passcode is obtained by the non-qualified sender manually querying a public dynamic passcode provider, and
transmit, to the dynamic passcode provider, the system key, the system hashing function, and an identification of recipient accounts at the exchange entity, wherein the dynamic passcode provider generates dynamic passcodes based upon queries of a static destination email addresses that corresponds to recipient accounts at the exchange entity, wherein the dynamic passcodes are based at least in part upon the system key, the system hashing function and a second counter stored in association with the static destination email address.

23. A system, comprising:
a memory for storing data and computer-executable instructions;

a processor in communication with the memory, wherein the processor is operative to execute the computer-executable instructions to:
  receive an electronic message addressed to a recipient, wherein the electronic message includes a source address associated with a sender and a dynamic tag, wherein the dynamic tag includes a first dynamic code and a counter;
  retrieve a hashing function and a secret key stored in the memory;
  compute a second dynamic code using at least the hashing function, the secret key, and the counter of the dynamic tag;
  verify the dynamic tag by matching the first dynamic code of the dynamic tag to the computed second dynamic code;
  accept the electronic message to an account of the recipient upon verifying at least the dynamic tag, wherein the sender is a non-qualified sender, wherein the dynamic tag is a dynamic passcode, wherein the processor is operative to retrieve a system hashing function and a system key as the respective hashing function and the secret key, wherein the dynamic passcode is obtained by the non-qualified sender manually querying a public dynamic passcode provider; and
  transmit, to the dynamic passcode provider, the system key, the system hashing function, and an identification of recipient accounts at the exchange entity, wherein the dynamic passcode provider generates dynamic passcodes based upon queries of a static destination email addresses that corresponds to recipient accounts at the exchange entity, wherein the dynamic passcodes are based at least in part upon the system key, the system hashing function and a second counter stored in association with the static destination email address.

* * * * *